United States Patent
Jain et al.

(10) Patent No.: US 12,387,100 B2
(45) Date of Patent: Aug. 12, 2025

(54) APPARATUS AND METHODS FOR LABELING TIME-SERIES DATA USING MACHINE LEARNING MODELS

(71) Applicant: Anumana, Inc., Cambridge, MA (US)

(72) Inventors: Rohit Jain, Danville, CA (US); Anand Ramani, Fresno, CA (US); Yogisha H J, Bengaluru (IN); Sanjeev Shrinivas Nadapurohit, Thane (IN); Karthik K Bharadwaj, Bengaluru (IN); Shiva Verma, Bangalore (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/973,049

(22) Filed: Dec. 8, 2024

(65) Prior Publication Data

US 2025/0209322 A1 Jun. 26, 2025

Related U.S. Application Data

(60) Provisional application No. 63/614,874, filed on Dec. 26, 2023.

(51) Int. Cl.
*G06N 3/08* (2023.01)
*G06F 17/40* (2006.01)
*G06N 3/04* (2023.01)

(52) U.S. Cl.
CPC ............. *G06N 3/08* (2013.01); *G06F 17/40* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 11,720,814 B2* | 8/2023 | Shen | G06V 10/764 |
| | | | 706/12 |
| 2020/0352462 A1* | 11/2020 | Pedalty | A61B 5/363 |
| 2021/0204858 A1 | 7/2021 | Attia et al. | |
| 2022/0218262 A1 | 7/2022 | Dziubinski | |
| 2023/0137626 A1 | 5/2023 | Teplitzky | |
| 2024/0008791 A1 | 1/2024 | Cha et al. | |
| 2025/0021822 A1* | 1/2025 | Chatterjee | G06N 20/00 |

FOREIGN PATENT DOCUMENTS

CN 114668401 A 4/2023

\* cited by examiner

*Primary Examiner* — Leon Flores
(74) *Attorney, Agent, or Firm* — Caldwell Intellectual Property Law

(57) ABSTRACT

An apparatus for labeling time-series data using machine learning models, comprising a processor and a memory containing instructions configuring the processor to receive time-series data, identify a plurality of time-series segments from received time-series data, pre-train at least a classifier using labeled training data, annotate, at a labeling module, each time-series segment of the plurality of time-series segments with at least one segment identification, retrain the at least a classifier using the annotated plurality of time-series segments, generate, using the at least a classifier, one or more segment identifications at each time-series segment subsequently identified based on continuous time-series data, and display a visual representation of the continuous time-series data with the segment identifications on a user interface.

18 Claims, 24 Drawing Sheets

APPARATUS AND METHODS FOR LABELING TIME-SERIES DATA USING MACHINE LEARNING MODELS

CROSS-REFERENCE TO RELATED APPLICATIONS

This application claims the benefit of priority of U.S. Provisional Patent Application Ser. No. 63/614,874, filed on Dec. 26, 2023, and titled "DATA MANAGEMENT AND MACHINE LEARNING MODELS FOR LABELING OF CARDIAC SIGNAL," which is incorporated by reference herein in its entirety.

FIELD OF THE INVENTION

The present invention generally relates to the field of signal processing and machine learning. In particular, the present invention is directed to an apparatus for labeling time-series data using machine learning models.

BACKGROUND

Monitoring of cardiac electrical signals, including intracardiac electrograms (EGMs) and surface electrocardiograms (ECGs) is critical to the diagnosis and treatment of heart disease. Several types of heart problems, including myocardial infarction and cardiac rhythm disorders are associated with characteristic patterns that can be detected with high sensitivity and specificity with the use of ECGs and EGMs. Accurate interpretation of ECGs and EGMs requires extensive training on the part of clinicians.

Even for trained personnel, accurate ECG and EGM interpretation can be limited by several factors, including interpretation subjectivity, human error, and requirements to interpret a large number of ECGs/EGMs in limited time. These challenges associated with manual identification/labelling of ECGs/EGMs may negatively impact diagnostic accuracy and a clinical decision-making.

SUMMARY OF THE DISCLOSURE

Cardiac arrhythmias are responsible for significant morbidity and mortality worldwide. Ablation of cardiac tissue(s) responsible for arrhythmia propagation has emerged as a highly effective therapeutic approach for arrhythmia treatment. For example, the ablation may be performed using radiofrequency, cryo, and the like.

Successful ablation procedures rely on precise mapping and identification of cardiac signals to locate and target aberrant conduction pathways. Existing systems are associated with limitations in accurate labeling of cardiac signals, leading to potential procedural inefficiencies and suboptimal outcomes.

In the field of cardiac electrophysiology, mapping systems are commonly used to navigate the intricate cardiac anatomy and record electrical signals. However, the labeling of these signals is often limited by factors such as noise interference, signal variability, and the dynamic nature of cardiac activity.

The present disclosure introduces a system and a method designed to label cardiac signals using machine learning models. In an embodiment, the cardiac signals may correspond to intracardiac signals. Examples of the intracardiac signals may include but are not limited to electrocardiogramaignals, surface cardiac signals, electro gram (EGM) signals, pulmonary vein potential (PVP) signals, brain signals, and the like.

Furthermore, the present disclosure also discloses a system and method for data management and visualization of the cardiac signals. The system incorporates machine learning models to improve the identification and classification of cardiac signals. Specifically, a machine learning module is integrated into the system, enabling adaptive learning from real-time cardiac signal data. The system continuously refines its labelling capabilities based on evolving patterns and variations in the cardiac signals. Furthermore, the present disclosure discloses a method and a script for real-time simulation of the cardiac signals and real-time segmentation of the cardiac signals. In comparison with traditional labelling techniques, the disclosed system may label the cardiac signals quickly and accurately.

In an aspect, an apparatus for labeling time-series data using machine learning models is illustrated. The apparatus includes at least a processor and a memory communicatively connected to the at least a processor, wherein the memory contains instructions configuring the at least a processor to receive time-series data, identify, using a detector, a plurality of time-series segments from received time-series data, wherein the detector includes a one-dimensional U-Net model configured to segment the time-series data into the plurality of time-series segments, pre-train at least a classifier using labeled training data, wherein the labeled training data includes a plurality of example time-series segments as input correlated to a plurality of example segment identifications as output, annotate, at a labeling module, each time-series segment of the plurality of time-series segments with at least one segment identification, retrain the at least a classifier using the annotated plurality of time-series segments, generate, using the at least a classifier, one or more segment identifications at each time-series segment of a plurality of time-series segments subsequently identified using the detector based on continuous time-series data, and display a visual representation of the continuous time-series data with the one or more segment identifications on a user interface.

In another aspect, a method for labeling time-series data using machine learning models is described. The method includes receiving, by at least a processor, time-series data, identifying, by the at least a processor, a plurality of time-series segments from received time-series data using a detector, wherein the detector includes a one-dimensional U-Net model configured to segment the time-series data into the plurality of time-series segments, pre-training, by the at least a processor, at least a classifier using labeled training data, wherein the labeled training data includes a plurality of example time-series segments as input correlated to a plurality of example segment identifications as output, annotating, by the at least a processor, each time-series segment of the plurality of time-series segments with at least one segment identification at a labeling module, retraining, by the at least a processor, the at least a classifier using the annotated plurality of time-series segments, generating, by the at least a processor, using the at least a classifier, one or more segment identifications at each time-series segment of a plurality of time-series segments subsequently identified using the detector based on continuous time-series data, and displaying, by the at least a processor, a visual representation of the continuous time-series data with the one or more segment identifications on a user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for labeling time-series data using machine learning models, the apparatus includes at least a processor and a memory communicatively connected to the at least a processor, wherein the memory contains instructions configuring the at least a processor to receive time-series data, identify, using a detector, a plurality of time-series segments from received time-series data, wherein the detector includes a one-dimensional U-Net model configured to segment the time-series data into the plurality of time-series segments, pre-train at least a classifier using labeled training data, wherein the labeled training data includes a plurality of example time-series segments as input correlated to a plurality of example segment identifications as output, annotate, at a labeling module, each time-series segment of the plurality of time-series segments with at least one segment identification, retrain the at least a classifier using the annotated plurality of time-series segments, generate, using the at least a classifier, one or more segment identifications at each time-series segment of a plurality of time-series segments subsequently identified using the detector based on continuous time-series data, and display a visual representation of the continuous time-series data with the one or more segment identifications on a user interface. Exemplary embodiments illustrating aspects of the present disclosure are described below in the context of several specific examples.

Figure 1:
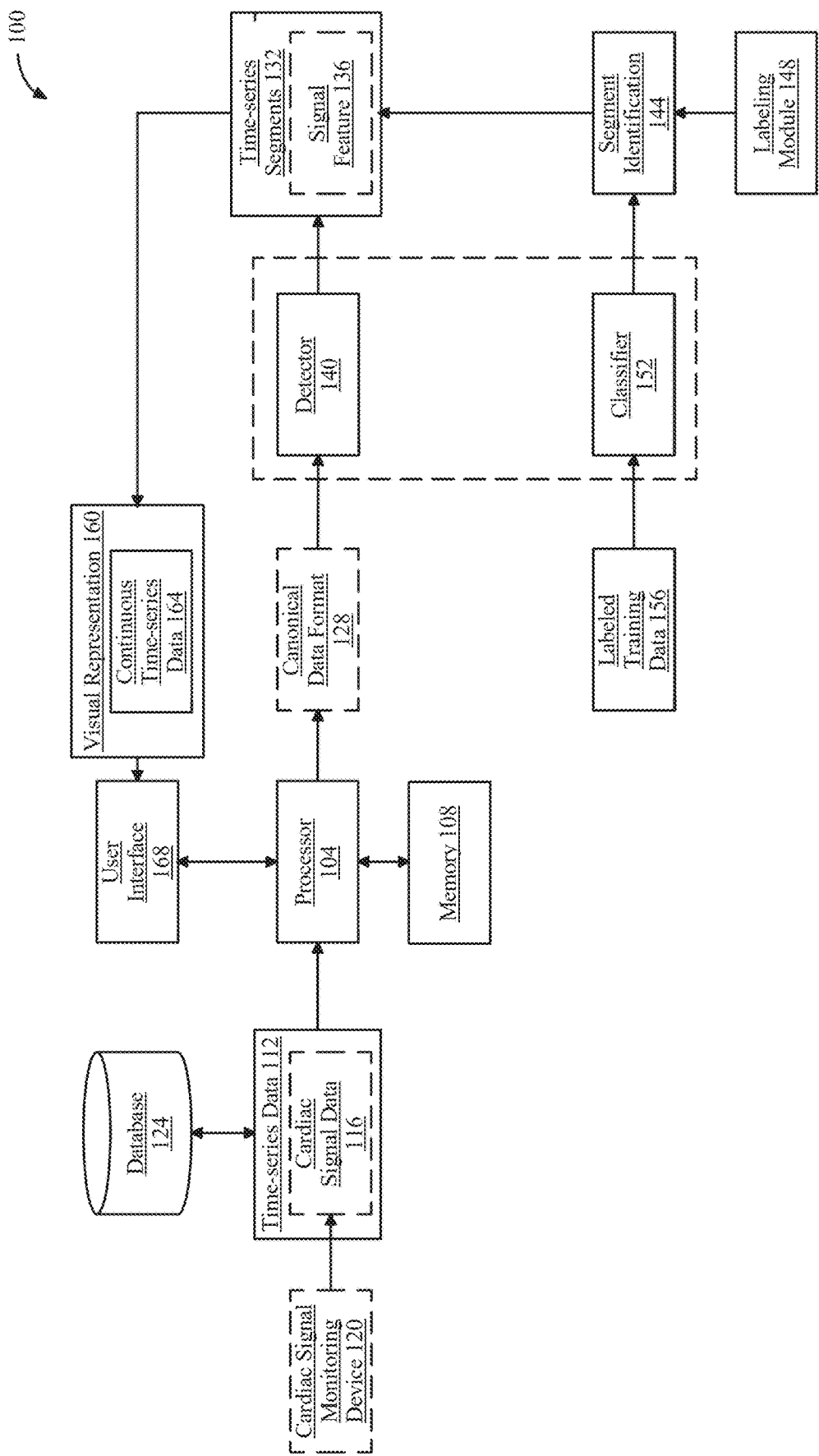
FIG. 1 is a block diagram of an exemplary embodiment of an apparatus for labeling time-series data using machine learning models.

Referring now to FIG. 1, an exemplary embodiment of an apparatus 100 for labeling time-series data using machine learning models is illustrated. Apparatus 100 includes a computing device. Computing device includes at least a processor 104 communicatively connected to a memory 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, at least a processor 104 is configured to receive time-series data 112. As used in the current disclosure, "time-series data" is any data that is indexed in time order. Time-series data 112 may be a continuous sequence of data points collected or recorded at successive points in time, at uniform intervals or in other cases, at irregular intervals. In some cases, each data point within time-series data 112 may measure, for instance, a value of a specific variable which may be any quantifiable attribute or phenomenon such as, without limitation, sensor outputs (e.g., temperature readings), biosignals (e.g., heart rate, blood pressure), financial metrics (e.g., stock prices, exchange rates), environmental measures (e.g., humidity levels, air quality indices), or any other variables that can be observed and recorded in chronological order.

With continued reference to FIG. 1, in an embodiment, time-series data 112 may described a plurality of electrical signals recorded, for example, and without limitation, at regular intervals to monitor electrical activity of a heart over time. As a non-limiting example, time-series data 112 may include cardiac signal data 116. As used herein, "cardiac signal data" refers to electrical signals generated by the heart's activity. In some cases, cardiac signal data 116 may be used to monitor and analyze the heart's function. For instance, and without limitation, cardiac signal data 116 may include one or more data points that represent the electrical impulses responsible for heartbeats, typically measured in terms of voltage over time. Cardiac signal data may be also used to diagnose and manage various cardiac conditions, such as, without limitation, arrhythmias, ischemia, myocardial infraction, among others.

With continued reference to FIG. 1, time-series data 112, such as cardiac signal data 116 may be received, in some cases, from one or more cardiac signal monitoring devices 120 communicatively connected to at least a processor 104. A "cardiac signal monitoring device," for the purpose of this disclosure, is an instrument or system designed to detect, record, and sometimes analyze the electrical activity of the heart. In some embodiments, cardiac signal monitoring device 120 may be equipped with one or more sensors, electrodes, and/or data acquisition system that capture cardiac signal data 116, which can then be, for example, and without limitation, be displayed, stored, and/or interpretated by users e.g., healthcare professionals or medical experts. Exemplary cardiac signal monitoring devices 120 may include, without limitation, wearable devices, electrophysiology catheters, Holter monitors, implantable loop recorders, and the like.

With continued reference to FIG. 1, in some embodiments, cardiac signal monitoring device 120 may include at least a sensor. Time-series data 112 may be generated using at least a sensor. As used in this disclosure, a "sensor" is a device that is configured to detect an input and/or a phenomenon and transmit information related to the detection. Sensor may detect a plurality of data. A plurality of data detected by sensor may include, but is not limited to, electrocardiogram (ECG) data, intracardiac electrogram (IEGM) data, electrical signals related to the heart, and the like. In one or more embodiments, and without limitation, sensor may include a plurality of sensors.

With continued reference to FIG. 1, as used in the current disclosure, "electrocardiogram data" is a signal representative of the electrical activity of the heart. The ECG data may consist of several distinct waves and intervals, each representing a different phase of the cardiac cycle. These waves may include the P-wave, QRS complex, T wave, U wave, and the like. The P-wave may represent atrial depolarization (contraction) as the electrical impulse spreads through the atria. The QRS complex may represent ventricular depolarization (contraction) as the electrical impulse spreads through the ventricles. The QRS complex may include three waves: Q wave, R wave, and S wave. The T-wave may represent ventricular repolarization (recovery) as the ventricles prepare for the next contraction. The U-wave may sometimes be present after the T wave, it represents repolarization of the Purkinje fibers. The intervals between these waves provide information about the duration and regularity of various phases of the cardiac cycle. The ECG data can be used to help diagnose various heart conditions, such as arrhythmias, myocardial infarction (heart attack), conduction abnormalities, electrolyte imbalances, coronary heart disease, and the like. In an embodiment, each sensor may generate an individual ECG data.

With continued reference to FIG. 1, as a non-limiting example, one or more cardiac signal monitoring device 120 may include an ECG machine. In one or more embodiments, and without limitation, sensor may include one or more electrodes, and the like. Electrodes used for an electrocardiogram (ECG) are small sensors or conductive patches that are placed on specific locations on the body to detect and record the electrical signals generated by the heart. Senor serves as the interface between the body and the ECG machine, allowing for the measurement and recording of the heart's electrical activity. A plurality of sensors may include 10 electrodes used for a standard 12-lead ECG, placed in specific positions on the chest and limbs of the patient. Sensors may also include various lead systems including, 1-lead, 2-lead, 6-leads, 12, leads, standard limb leads, augmented limb leads, pectoral leads, and the like. These electrodes are typically made of a conductive material, such as metal or carbon, and are connected to lead wires that transmit the electrical signals to the ECG machine for recording. Proper electrode placement may be crucial to ensure accurate signal detection and recording. A number of electrodes used by an ECG machine may depend on a particular machine in use and may vary from a single electrode on a wearable device to twelve or more electrodes, or any number in between.

With continued reference to FIG. 1, the plurality of sensors may be placed on each limb, wherein there may be at least one sensor on each arm and/or leg of the user. These sensors may be labeled I, II, III, V1, V2, V3, V4, V5, V6, and the like. For example, Sensor I may be placed on the left arm, Sensor II may be placed on the right arm, and Sensor III may be placed on the left leg. Additionally, a plurality of sensors may be placed on various portions of the patient's torso and chest. For example, a sensor V1 may be placed in the fourth intercostal space at both the right sternal borders and sensor V2 may be fourth intercostal space at both the left sternal borders. A sensor V3 may also be placed between sensors V2 and V4, halfway between their positions. Sensor V4 may be placed in the fifth intercostal space at the midclavicular line. Sensor V5 may be placed horizontally at the same level as sensor V4 but in the anterior axillary line. Sensor V6 may be placed horizontally at the same level as V4 and V5 but in the midaxillary line.

With continued reference to FIG. 1, the plurality of sensors may include augmented unipolar sensors. These sensors may be labeled as aVR, aVL, and aVF. These sensor may be derived from the limb sensors and provide additional information about the heart's electrical activity. These leads are calculated using specific combinations of the limb leads and help assess the electrical vectors in different orientations. For example, aVR may be derived from Sensor II and Sensor III. In another example, aVL may be derived from sensor I and Sensor III. Additionally, aVF may be derived from Lead I and Lead II. The combination of limb sensors, precordial sensors, and augmented unipolar sensors allows for a comprehensive assessment of the heart's electrical activity in three dimensions.

With continued reference to FIG. 1, as described herein, "intracardiac electrogram (IEGM) data" is a signal representative of the electrical activity recorded within the heart. IEGM data may include detailed information about the local electrical events in specific heart chambers or regions. IEGM data may include several distinct waves and segments, each representing different phases of the cardiac cycle and localized electrical activities. These segments may include atrial electrograms, ventricular electrograms, and specific potentials such as Pulmonary Vein Potentials (PVPs). Atrial electrograms may represent the electrical activity associated with atrial depolarization, while ventricular electrograms may correspond to ventricular depolarization and repolarization. PVPs are critical in the context of atrial fibrillation, indicating electrical activity in the pulmonary veins. The attributes of these segments, such as amplitude, duration, and morphology, provide vital information for diagnosing and treating various cardiac conditions, including arrhythmias and conduction abnormalities. In an embodiment, each catheter or sensor placed within the heart may generate individual IEGM data, which can be processed and analyzed to support clinical decision-making during electrophysiological studies and ablation procedures.

With continued reference to FIG. 1, as a non-limiting example, one or more cardiac signal monitoring device 120 may include at least a catheter. Time-series data 112 such as IEGM data may be generated using at least a catheter. As used in this disclosure, a "catheter" is a device that is configured to detect electrical activity within the heart and transmit information related to this activity. The catheter may detect a plurality of data. A plurality of data detected by the catheter may include, but is not limited to, IEGM data, electrical signals related to specific regions of the heart, and the like. In one or more embodiments, and without limitation, a catheter may include a plurality of electrodes positioned along its length.

With continued reference to FIG. 1, at least a catheter may include an electrophysiology (EP) catheter. In one or more embodiments, and without limitation, the catheter may include one or more electrodes, mapping electrodes, and the like. Electrodes used for intracardiac recordings are small sensors embedded in the catheter that detect and record the electrical signals generated by the heart from within its chambers. The catheter may serve as the interface between the heart's internal environment and the recording system, allowing for the measurement and recording of localized electrical activity. A plurality of electrodes may be arranged along the catheter to capture detailed and specific intracardiac signals. These electrodes are typically made of a conductive material, such as platinum or iridium, and are connected to lead wires that transmit the electrical signals to the recording system for processing. Proper catheter placement is crucial to ensure accurate signal detection and recording. The number of electrodes on a catheter may vary depending on the particular catheter in use and may range from a few to several dozen, depending on the mapping and ablation needs.

With continued reference to FIG. 1, the plurality of electrodes on the catheter may be positioned at various strategic locations within the heart. For example, electrodes may be placed in the right atrium, right ventricle, left atrium, left ventricle, and pulmonary veins. These electrodes are labeled based on their position and function, such as His-bundle electrodes for detecting signals from the His bundle, or coronary sinus electrodes for signals from the coronary sinus. Additionally, the electrodes may be placed at various positions to create a three-dimensional map of the heart's electrical activity during procedures like catheter ablation. For example, electrodes may be positioned in the right atrial appendage, the left atrial appendage, and around the pulmonary vein ostia to capture detailed electrical activity from these regions.

With continued reference to FIG. 1, the plurality of electrodes may also include specialized electrodes for different types of mapping and ablation procedures. These may include circular mapping catheters for creating comprehensive electrical maps of the atria or contact force-sensing catheters that provide feedback on the pressure applied to the heart tissue during ablation. These catheters are connected to advanced electrophysiology recording systems that amplify, filter, and process the signals for real-time visualization and analysis. The combination of various catheter types and electrode configurations allows for a detailed and comprehensive assessment of the heart's electrical activity, aiding in the diagnosis and treatment of complex arrhythmias.

With continued reference to FIG. 1, time-series data 112 may additionally, or alternatively include cardiac computed tomography (CT) signals, cardiac magnetic resonance imaging (MRI) signals, echocardiography signals, and various ablation delivery signals. Catheter signals, such as those measuring positional stability, temperature, and contact force, offer detailed information about the conditions within the heart during invasive procedures. Cardiac CT and MRI signals provide high-resolution images of the heart's structure and function, helping to identify anatomical abnormalities. Echocardiography signals use ultrasound waves to create real-time images of the heart, allowing for the assessment of cardiac function and blood flow. Ablation delivery signals, including those from radiofrequency (RF), cryoablation (Cryo), and pulsed-field ablation (PFA) procedures, are critical for monitoring and guiding therapeutic interventions to treat arrhythmias.

With continued reference to FIG. 1, any past or present versions of any data disclosed herein may be stored within one or more databases 124 communicatively connected to at least a processor 104. For example, in some cases, one or more databases 124 may be local to processor 104. In other cases, database 124 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network.

Figure 6:
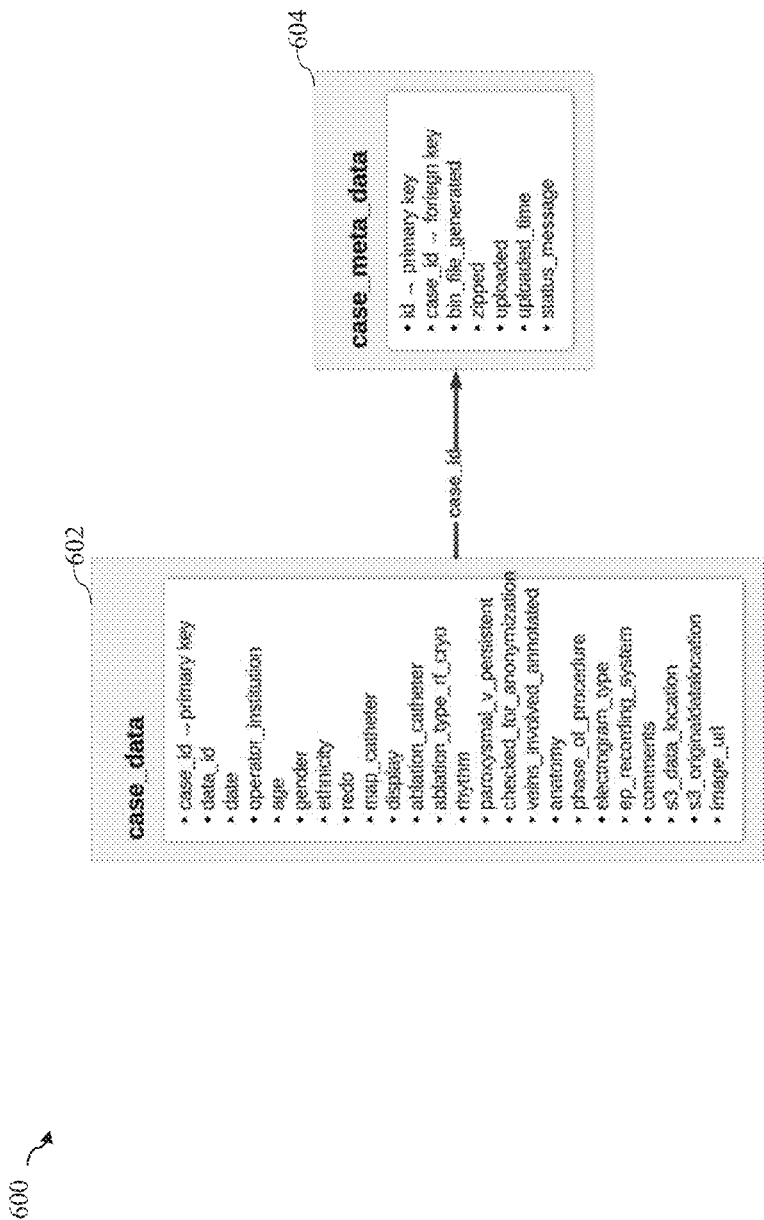
FIG. 6 illustrates tables for case id and case metadata, in accordance with an example embodiment.
Figure 7A:
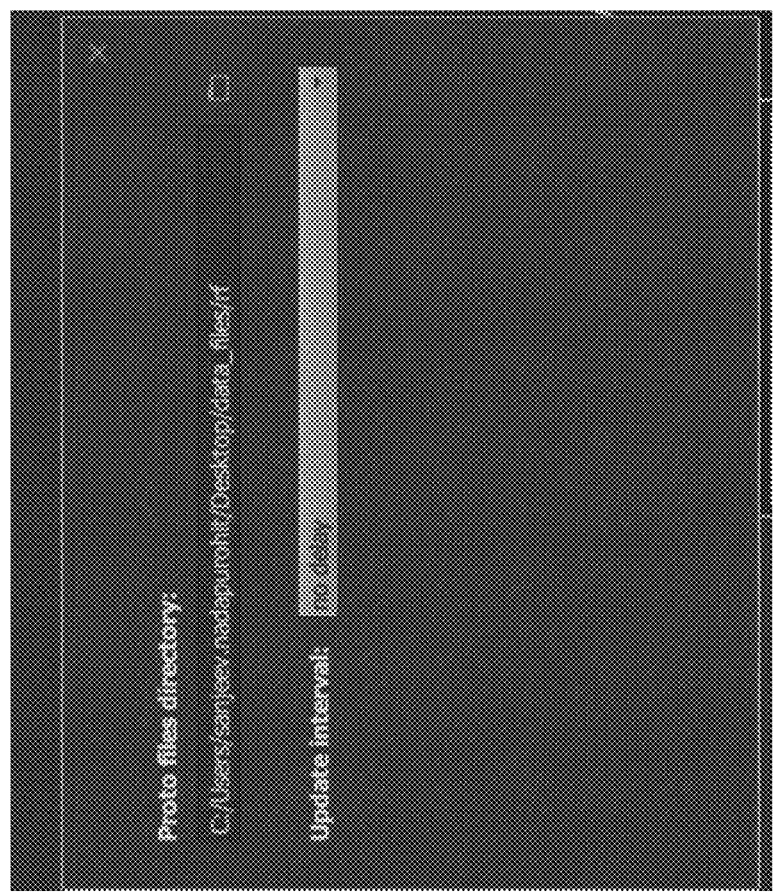
FIGS. 7A-7E illustrates user interface associated with the tool for labelling the cardiac signals, in accordance with an example embodiment.
Figure 7B:
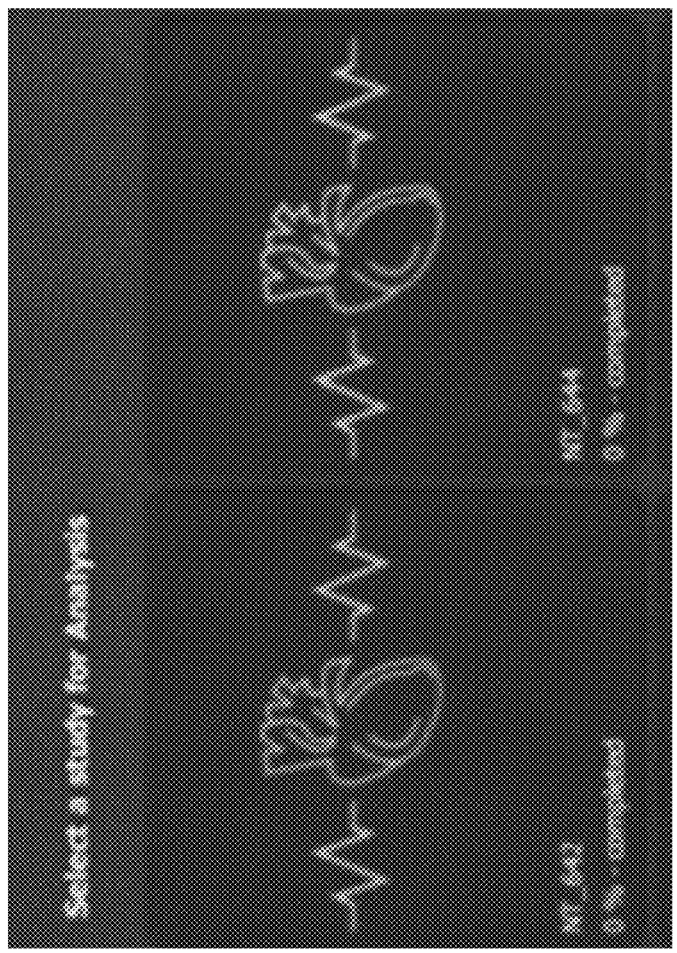
Figure 7C:
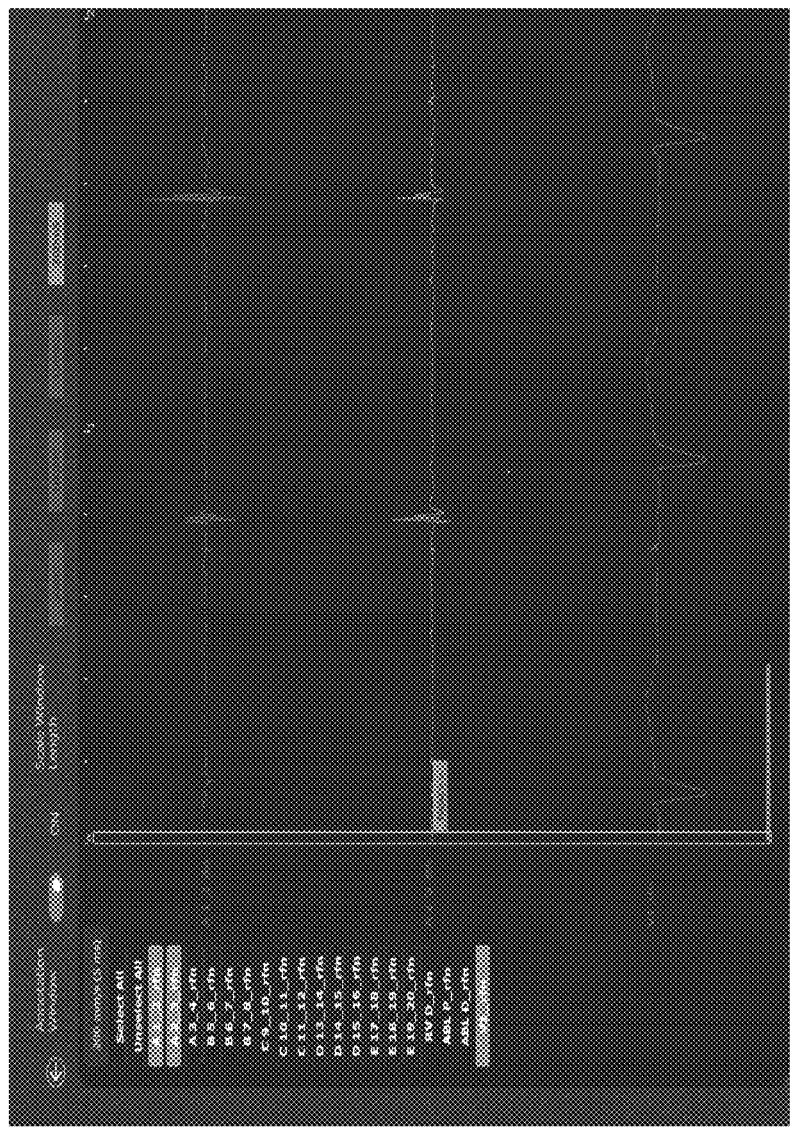
Figure 7D:
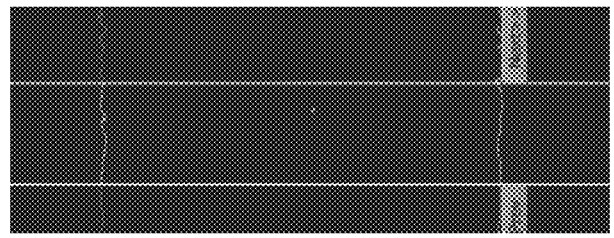
Figure 7D:
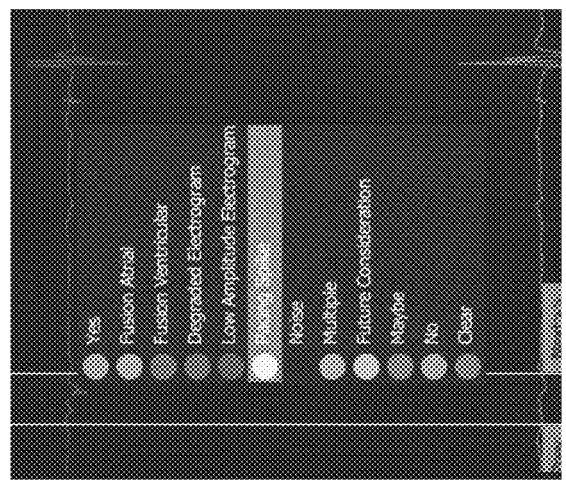
Figure 7E:
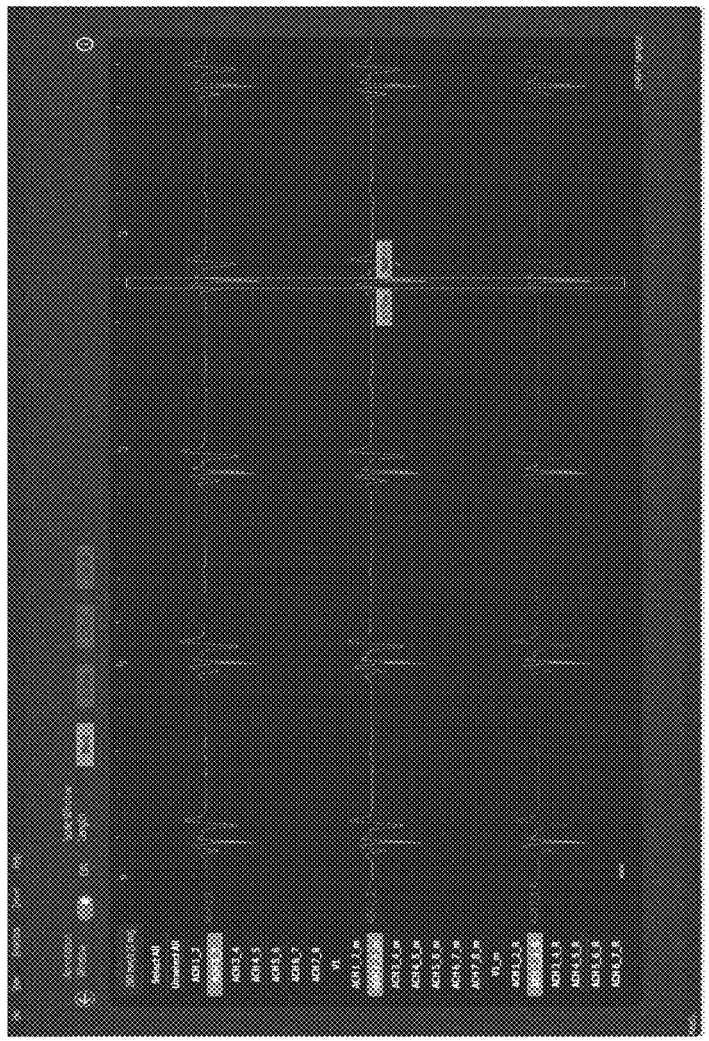

With continued reference to FIG. 1, as a non-limiting example, time-series data 112 may be deposited in AWS S3 with the location of the case and its metadata stored in the spreadsheet named the "master spreadsheet". In this process we have an algorithm which takes the following filters such as Rhythm, Ablation Type, Redo, Paroxysmal, and Anatomy. Time-series data 112 that may have not undergone preprocessing and satisfy the filters applied may be downloaded from S3. Time-series data may include metadata associated with it which tells more about the nature of the case. This metadata is important for domain knowledge and future analytics where we determine the nature in which detection algorithms are trained. As a non-limiting example, there are total 3 tables that follow metadata management schema as shown in FIG. 6.

With continued reference to FIG. 1, at least a processor 104 may be configured to receive time-series data 112 from one or more databases 124, data repositories, and any other data storage systems using an application programming interface (API). As used herein, an "application programming interface" is a set of functions that allow applications to access data and interact with external software components, operating systems, or microdevices, such as another application or computing device. An API may define the methods and data formats that applications can use to request and exchange information. In an embodiment, API may deliver, according to a set of configurations, time-series data 112 to at least a processor 104 from a system/application that is associated with a user e.g., patient, medical professionals, healthcare provider, medical facility, or any other third-party custodian of time-series data 112.

With continued reference to FIG. 1, throughout the present disclosure, the term "users" refers to individuals or entities interacting with apparatus 100 and system described herein. Users may encompass a diverse group of individuals or entities, contributing to and benefiting from collection, analysis, interpretation of any data, as well as operation of any devices within system, and execution of any processing steps as described herein. This includes but is not limited to individuals (e.g., patient or any other third-party custodian) providing time-series data 112 through cardiac signal monitoring devices 120, medical experts and healthcare professionals such as cardiologist, electrophysiologist, nurses, and any technicians utilizing apparatus 100 for diagnosing and managing cardiac conditions.

With continued reference to FIG. 1, one or more databases 124 may be implemented, without limitation, as a relational database, a key-value retrieval database such as a NOSQL database, or any other format or structure for use as a database that a person skilled in the art would recognize as suitable upon review of the entirety of this disclosure. One or more databases 124 may alternatively or additionally be implemented using a distributed data storage protocol and/or data structure, such as a distributed hash table or the like. Each database of the one or more databases 124 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in one or more embodiments, receiving the time-series data 112 may include processing time-series data 112 by converting time-series data 112 into a canonical data format 128. A "canonical data format," for the purpose of this disclosure, is a standardized, uniform, consistent structure used to represent data across one or more processing steps as described herein. In some cases, canonical data format 128 may ensure consistency in representations of time-series data. As a non-limiting example, time-series data 112 in canonical data format 128 may include fixed-length segments, standardized amplitude scales, common time base, and the like. Time-series data 112 in canonical data format 128 may be easily interpretable, comparable, and/or integrable regardless of its source or initial structured. The objective of the Preprocess step of the raw time-series data 112 such as, without limitation, EGM and ECG data is to extract the raw electrogram and Electrocardiogram data from the S3 bucket, metadata management system and upload the data in the protobuf format. As a non-limiting example, time-series data 112 may include 12 electrocardiogram and electrogram data that has been recorded for the ablation procedure along with metadata for the case.

With continued reference to FIG. 1, in some cases, converting time-series data 112 into canonical data format 128 may include de-identifying time-series data 112. "De-identifying," as described herein, refers to a process of removing, or obscuring personal identifiers from the data to protect user privacy and comply with regulatory standards (e.g., Health Insurance Portability and Accountability Act [HIPAA]). In an embodiment, de-identified time-series data may include time-series data 112 that has been stripped of user identifiers e.g., patient names, age, address, contact information, medical record numbers, date of birth, and other personally identifiable information (PII). Processor 104 may load time-series data 112 via a data loader configured to read raw data from various sources (including cardiac signal monitoring device 120, database 124, cloud storage, and the like), and perform necessary preprocessing steps as described herein.

With continued reference to FIG. 1, in some cases, canonical data format conversion may be carried out by one or more scripts, each may outline one or more required preprocessing steps. Time-series data 112 in canonical data format 128 may aid in enhancing the performance of one or more machine learning models as described below. As a non-limiting example, time-series data 112 such as an EGM signal dataset may include a plurality of tagged segments, including negative segments (typically 150 ms) and positive segments (typically 50 ms, representing the PVP signal). In some cases, processor 104 may crop EGM signal dataset into segments each have a fix length that match with the model's input size; for example, and without limitation, if model's input size is fixed at 200 ms, which corresponds to 200 data points, 200 ms segments may then be randomly cropped around the tagged negative and positive segments.

With continued reference to FIG. 1, in some cases, processing time series data 112 may be done using one or more digital filtering techniques to enhance the quality of the recorded signals. As used in the current disclosure, "digital filtering techniques" are methods used to manipulate and refine digital signals to remove unwanted components. This may include removing noise or artifacts, while preserving the essential features of the signal. Digital filtering techniques may ensure that the time-series data 112 is accurate and reliable for any subsequent processing, segmentation, and analysis. A digital filtering technique may include the application of mathematical algorithms to the raw data to isolate and remove specific frequency components. For example, low-pass filters may allow signals with frequencies below a certain threshold to pass through while attenuating higher frequency noise. Conversely, high-pass filters permit high-frequency signals to pass while reducing the impact of lower frequency interference. Band-pass filters combine these principles to isolate a specific range of frequencies, which is particularly useful for focusing on the relevant portions of the cardiac signal. Examples of digital filtering techniques may include the use of Finite Impulse Response (FIR) filters, which apply a finite sequence of weights to the signal. FIR filters are known for their stability and linear phase response, making them ideal for applications requiring precise timing, such as ECG and IEGM data analysis.

With continued reference to FIG. 1, another technique is Infinite Impulse Response (IIR) filters, which use feedback to create a response that can theoretically last indefinitely. IIR filters are efficient in terms of computational resources and are widely used for real-time signal processing. Additionally, adaptive filtering techniques, such as the least mean squares (LMS) algorithm, can dynamically adjust their parameters in response to changes in the signal characteristics. This adaptability makes them particularly effective in environments with varying noise levels. Wavelet transform is another advanced filtering technique that decomposes the signal into components at different scales, allowing for the selective filtering of noise while retaining important signal features.

With continued reference to FIG. 1, processed time-series data 112 may be subsequently verified, for instance, and without limitation, converted canonical data validation may be performed for formatting and integrity check. As a non-limiting example, converted canonical data validation may be performed on each converted time-series data 112 based on an identifier associated with leads, a size, and the like specified in a script. In some cases, script may include one or more pre-defined configuration settings. As used in this disclosure, "pre-defined configuration settings" are specific criteria and rules established to ensure that the processed time-series data 112 meets the required standards for accuracy, consistency, and compatibility with one or more integrated modules such as labeling module and one or more machine learning models as described below. As a non-limiting example, pre-defined configuration settings may include parameters such as signal length, amplitude range, sampling frequency, and acceptable noise levels. In some cases, pre-define configuration settings may be implemented as a software routines that automatically verify and standardize the incoming data.

With continued reference to FIG. 1, processor 104 is configured to identify a plurality of time-series segments 132 from received time-series data 112. As used in this disclosure, a "time-series segment" refers to a contiguous subset of time-series data that is defined by specific start and end points within the overall dataset. Each time-series segment of the plurality of time-series segments 132 may capture, for instance, and without limitation, a discrete portion of the time-series data 112 and is used for analysis, processing, and/or labeling to identify one or more specific events or patterns within time-series data 112. Processor 104 may identify and characterizing cardiac events by examining, for example, and at least in part, the activity of the heart over a defined time window.

With continued reference to FIG. 1, as a non-limiting example, time-series data 112, such as an ECG recording taken over a period of 24 hours may be divided into smaller, manageable parts e.g., a plurality of 5-second segments, wherein each segment may be analyzed, by the at least a processor 104, for the presence of arrhythmias. As another non-limiting example, during a cardiac stress test, ECG recording may be segmented into a plurality of 10-second intervals to monitor changes in heart rate and rhythm under physical exertion. In other embodiments, time-series data 112, such as, without limitation, an EGM signal collected, for example, during a catheter ablation procedure may be divided into 1-second segments to pinpoint the exact location of abnormal electrical pathways.

With continued reference to FIG. 1, in some cases, each time-series segment of plurality of time-series segments 132 may include at least a signal feature 136. As used in this disclosure, a "signal feature" is a specific characteristic or attribute within a time-series segment of time-series data 112 that provide information about the underlaying physiological, or pathological condition being monitored. As a non-limiting example, plurality of time-series segments 132 identified from cardiac signal data 116 may represent various phases of the cardiac cycle, such as atrial depolarization, ventricular depolarization, and ventricular repolarization. Each time-series segment of plurality of time-series segments 132 may be defined by its start and end points, duration, and the specific attributes it contains, such as amplitude, frequency, and morphology.

With continued reference to FIG. 1, in some cases, plurality of time-series segments 132 may be identified based on presence of one or more signal features. Exemplary embodiments of signal features may include, without limitation, morphological features (e.g., the shape of P wave, QRS complex, T wave in an ECG, amplitude of the wave, and duration of the wave), temporal features (e.g., time intervals between waves such as PR interval, QT interval, and RR interval, heart rate, and repetition patterns in wave occurrences), frequency features (e.g., specific frequency bands), among others. Processor 104 may be configured to segment time-series data 112 into plurality of time-series segments 132 if a particular signal feature, for example, and without limitation, at least a QRS complex is detected. As person skilled in the art, upon reviewing the entirety of this disclosure, will be aware of various signal features that can be used identify plurality of time-series segments 132, specific cardiac conditions, abnormalities, or events.

With continued reference to FIG. 1, in some embodiments, processor 104 may implement a feature extraction process configured to extract at least a signal features 136 from time-series data 112 or plurality of time-series segments 132 thereof. In some cases, feature extraction may decompose a time-series segment into its constituent features. Exemplary non-limiting features may include corners, edges, lines, closed loops, line direction, line intersections, and the like. In some cases, feature extraction may reduce dimensionality of representation and may make the identification process computationally more efficient. In some cases, extracted features can be compared with an abstract vector-like representation of known cardiac events or patterns, which might reduce to one or more classification labels (e.g., segment identifications) as described in further detail below. General techniques of feature detection in computer vision, such as, without limitation, edge detection, corner detection, contour tracing, and the like are applicable to the analysis of time-series data 112 as described herein. In some embodiments, machine-learning processes like nearest neighbor classifiers (e.g., k-nearest neighbors algorithm) may be used to compare extracted features with stored signal features and choose a nearest match.

With continued reference to FIG. 1, a non-limiting example of a time-series segment in cardiac electrophysiology may involve a segment of EGM data that is 200 milliseconds long. Within such time-series segment, one or more signal features might be identified, such as, without limitation, a sharp deflection indicative of a ventricular depolarization event, or a low amplitude signal associated with a pulmonary vein potential using feature extraction process. These signal features may be used to diagnose conditions like ventricular tachycardia or to guide interventions such as catheter ablation.

With continued reference to FIG. 1, one or more machine learning models may be trained to identify plurality of time-series segments 132 from time-series data 112. A detector 140 is used to identify plurality of time-series segments 132 from time-series data 112, wherein the detector 140 includes a one-dimensional (1D) U-net model trained to segment time-series data 112 into plurality of time-series segments 132. As described herein, a "U-net" is a type of convolutional neural network (CNN) architecture having a symmetric U-shape structure involving a contracting path (encoder) and an expansive path (decoder).

With continued reference to FIG. 1, contracting path is responsible for capturing the context and features of input data through a series of convolutional layers; for example, and without limitation, encoder may include a plurality of blocks, each contains one or more convolutional layers followed by an activation function (e.g., ReLU) and a max-pooling layer for down-sampling. In some cases, contracting path may reduce spatial dimension of the data input while increasing the depth of feature maps.

With continued reference to FIG. 1, expansive path is responsible for reconstructing the data input spatial dimensions from the encoded feature maps. As a non-limiting example, decoder may include a plurality of blocks, each containing an up-sampling) or transposed convolution) layers followed by one or more convolutional layers followed by corresponding activation functions. Skip connections from corresponding layers in contracting path may be concatenated with up-sampled feature maps.

With continued reference to FIG. 1, U-net may include at least a bottleneck layer situated at the bottom of U-shaped structure and serve as a bridge between contracting and expansive paths. At least a bottleneck layer may include one or more convolutional layers that further process the encoded feature maps before passing them to the expansive path. An output layer that reduce the number of feature maps to a final segmentation map may be implemented as a final layer of the U-net. 1D U-Net model is described in further detail below with reference to FIGS. 2A-B.

With continued reference to FIG. 1, in some cases, detector 140 such as 1D U-Net model may be trained on a required dataset having an input and output configuration (e.g., training data). Training data of detector 140 may include a plurality of time-series data as input correlated to a plurality of segmented maps as output. In an embodiment, plurality of time-series data may include a collection of 1D arrays of signal amplitudes, wherein each 1D array is associated with a segmented map where each time point in the array input is labeled according to a pre-defined signal feature. As a non-limiting example, training data may include a plurality of electrogram segments, each one of the plurality of electrogram segments may be labelled as negative samples or positive samples. In some cases, among the pre-defined labels, label "Yes" and "Fusion atrial" may be considered as positive samples and the rest of them may be considered negative samples. In some cases, the labels may be defined based on the suggestions of users e.g., domain experts.

With continued reference to FIG. 1, 1D U-Net model may be initialized with random weights. A loss function, for example, and without limitation, a binary cross-entropy loss may be employed for a pixel-wise segmentation learning, measuring dissimilarity between, for example, and without limitation, predicted segmentation masks and ground truth provided within training data. In some embodiments, an optimization algorithm may be implemented, for example, and at least in part, an Adam optimization algorithm may be used by detector 140 to update model weights during each iteration of the training process.

With continued reference to FIG. 1, detector 140 may be programed with an initial set of hyperparameters. As a non-limiting example, an initial learning rate of 0.001 may be applied, with a ReduceLROnPlateau Scheduler configured to subsequently adjust the initial learning rate based on validation loss calculated post training. Additionally, or alternatively, a batch size of 32 may be utilized during training for efficient weight updates. Detector 140 may be trained for a maximum of 100-1000 epochs (i.e., iterations) or more, with an early stopping if, for example, without limitation, the validation loss doesn't improve for a predetermined number of consecutive epochs (e.g., 5, 10, 20, or more). As a non-limiting example, detector may be trained for 26 epochs. In some cases, detector 140 may be trained on one or more graphic processing unit (GPU) e.g., a Geforce GTX 1080 GPU with 8 GB memory, using PyTorch or TensorFlow as the deep learning framework.

With continued reference to FIG. 1, input data of detector 140 may a 1D time-series, such as, without limitation, ECG data recorded from a single lead. As a non-limiting example, 200 ms signals may be randomly cropped around tagged segments to provide model input. Detector 140 e.g., 1D U-net model may include an encoder configured to capture signal features, such as wave shapes, intervals, and the like from input time-series, a bottleneck layer processes captured signal features to create a compact representation that retains essential information, a decoder that reconstructs plurality of time-series segments 132, and an output layer configured to produce a segmented time-series. In some cases, decoder may include one or more skip connections to retain high-resolution signal features within plurality of time-series segments 132.

With continued reference to FIG. 1, further, processor 104 may implement a sampler, for example, a weighted random sampler that samples elements from a given dataset with a specified probability weight. In some cases, a separate validation set, consisting of 5%-30% of the training data, may be separated from original training data to evaluate the model's performance. Detector 140 may be trained essentially using the remaining 95%-70% of the training data. Detector 140 may be evaluated using one or more evaluation metrics e.g., intersection over union (IOU), an accuracy, a precision, a recall, a F1-score, AU-ROC, among others to access the model's performance.

With continued reference to FIG. 1, each time-series segment of plurality of time-series segments is annotated with at least one segment identification 144. As used in this disclosure, a "segment identification" is a label or a set of labels assigned to a specific segment of time-series data 112. A "label," for the purpose of this disclosure, is a descriptive annotation indicating a presence of particular features, events, or conditions within the assigned time-series segment of time-series data 112. In some cases, segment identification may include binary segment identification. For example, and without limitation, a time-series segment of an ECG recording may be labeled as either "normal," or "abnormal." As a non-limiting example, plurality of time-series segments 132 may be classified into two types, positive samples and negative samples. Positive samples may be associated with "yes" label, "fusion atrial" label, while negative samples may be associated with "no" label, "fusion ventricular" label, "degraded" label, "low-amplitude" label, "pacing spikes" label, "noise" label, "future consideration" label, and the like. In other cases, at least one segment identification may include a multi-label segment identification. As a non-limiting example, a single time-series segment of an ECG recording May have multiple labels indicative of different characteristics, such as, without limitation, a first label of "atrial fibrillation and a second label of "low amplitude." In some cases, characteristics of each time-series segment may be interrelated.

With continued reference to FIG. 1, in some embodiments, at least one segment identification 144 may be used to identify different phases of the cardiac cycle and for diagnosing potential abnormalities. For example, in the analysis of electrocardiogram (ECG) data, a signal identification "P-wave" may be assigned to a time series segment representing an atrial depolarization, characterized by a small, smooth upward deflection. For another example, segment identification "QRS complex" may denote a time-series segment representing a ventricular depolarization, identified by its sharp, rapid sequence of deflections.

With continued reference to FIG. 1, additionally, or alternatively, at least one segment identification 144 may be also used to indicate more complex or pathological events. Labels such as, without limitation, "atrial fibrillation" or "ventricular tachycardia" may be used to identify time-series segments where the signal shows irregular rhythms or abnormally high heart rates, respectively. As a non-limiting example, at least one segment identification 144 may include a diagnostic label. As used in the current disclosure, a "diagnostic label" is a term or set of terms assigned to a specific time-series segment identifying and categorizing one or more clinical phenomena. In some cases, such segment identification may be used to diagnose diseases, or at least in part, aid in diagnosis of diseases, guide treatment plans, and monitor patient health over time. Other exemplary embodiments of diagnostic labels may include, without limitation, "sinus rhythm" (SINUS) for regular heartbeat patterns, "atrial flutter" (AFL) for rapid contractions of the atria, or "isolated potential" (ISO_POT) for spontaneous depolarization events that may indicate electrical isolation of a heart region.

With continued reference to FIG. 1, in some cases, at least a segment identification 144 may be provided by users. Each time-series segment of plurality of time-series segments 132 is labeled, at a labeling module 148, with at least one segment identification 144. As described herein, a "labeling module" is a program configured to assign labels to time series segments. As a non-limiting example, labeling module may include a labeling tool implemented to facilitate expert annotation/data manual labeling. Labeling module 148 may receive time-series data 112 and plurality of time-series segments 132 thereof from database 124 or an accessible cloud platform via one or more endpoints. Labeling module may be equipped with a user interface (as described below) that allow users to visualize time-series data 112 and plurality of time-series segments 132 and assign appropriate labels. User may directly manipulate time-series data 112 and plurality of time-series segments 132 thereof by interacting with user interface, for example, and without limitation, to mark specific signal features, patterns, or anomalies within each time-series segment.

With continued reference to FIG. 1, in some cases, previously identified and annotated plurality of time-series segments 132 (e.g., historical time-series segments) may be loaded, for example, and without limitation, using a data loader, based on reception of the labels from users e.g., clinicians, wherein the data loader may be configured to extract data from the database 124 for the desired clinician.

In some cases, labeling module 148 may implement a "date" filter that allows users to view the data from a particular date via user interface. In some cases, segment identifications may be mapped to the corresponding case IDs to get a combined, detailed view. Labeling module 148 may be configured to check if there are any overlapping segments of labels and any other possible human errors from the users. Based on a determination of data quality, labeling module 148 may create the table view of time-series data 112 in an intermediate form which has, for example, and without limitation, labels, studycase_id, the time when it was annotated, the start index, and the end index of the time-series segment.

With continued reference to FIG. 1, in some cases, users e.g., domain experts may review and adjust segment identifications when inaccurate labels are detected. Users may review segment identifications and labels in-line or in a different mode of view e.g., a list view. As a non-limiting example, user interface may incorporate functionalities, such as, without limitation, zooming in on specific time-series segment of plurality of time-series segments 132, overlaying segment identifications, providing contextual information about time-series segment being labeled and/or the like. Additionally, or alternatively, labeling module 148 may be implemented to support batch processing of plurality of time-series segments, allowing users to annotate plurality of time-series segments 132 efficiently. In other cases, data may be split into multiple chunks, one each per case-id. These tables and the intermediate form of the raw prucka files may be sent to the model pipeline as described below. In the event of updating the definitions of labels, a backup of this data frame may be stored in AWS S3 with the timestamp (in case a restore is necessary) and the new labels conforming to the setup guidelines are updated, providing data versioning. Additional description of user interface is disclosed below with reference to FIGS. 4B-G.

With continued reference to FIG. 1, process of determining and assigning at least one segment identification 144 or label may involve one or more machine learning models that have been trained on datasets of annotated cardiac signals. In an embodiment, apparatus 100 as described herein may focus on the training of a deep learning algorithm to identify the different types of signal from the prucka data that has been recorded during the procedure. Algorithms are trained on the prelabeled data that has undergone the process of annotation by the experts in the cardiology domain. The annotated data is later used to train algorithms for efficient detection. The accuracy of the data depends on many factors, one of which is data management. The goal of this process is to have the data in the format that can be used by the data scientists to train the algorithm. The data management is divided into three phases such as Preprocessing the raw EGM and ECG data and labeling the pre-processed data.

With continued reference to FIG. 1, processor 104 is configured to train at least a classifier 152 using labeled training data 156. A "classifier," as used in this disclosure, is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Processor 104 may generate labeled training data 156 using plurality of annotated time-series segments. Each time-series segment of plurality of time-series segments 132 may be paired with at least one segment identification 144. As a non-limiting example, labeled training data 156 may include a plurality of example time-series segments as input correlated to a plurality of example segment identifications as output. At least a classifier 152 may include, without limitation, convolutional neural network (CNN), support vector machine (SVM), recurrent neural network (RNN), and the like.

With continued reference to FIG. 1, in an embodiment, at least a classifier 152 may be pre-trained, e.g., initially trained on a large, generic dataset prior to being fine-tuned on a specific, smaller dataset related to a target task, for example, and without limitation, generating at least one segment identification 144. Pre-training of at least a classifier 152 may allow the trained model to learn useful high-level feature representations (e.g., basic shapes, signal amplitude variations, temporal patterns, and the like) from a broader dataset, which can then be adapted for generating at least one segment identification 144 with additional training. As a non-limiting example, required labeled training data 156 may be a comprehensive dataset of labeled time-series data with relatively low accuracy. Labeled training data 156 may not be specific to cardiac signal data but may include other biomedical signals or synthetic data designed to simulate various signal features.

With continued reference to FIG. 1, medical datasets, especially those with high-quality annotations, may often be limited in size. Pre-training a machine learning model may allow the machine learning model to leverage a large, generic dataset to learn a set of initial features, reducing the need for an extensive specific dataset associated with a high cost. Pre-trained machine-learning model may be generalized to new, unseen data where the variability is high. Pre-training process may make overall training process more data-efficient, as the model may achieve a high performance with fewer labeled examples in the subsequent fine-tuning stage. In some cases, pre-training as described herein may leverage transfer learning where knowledge gained from one task (e.g., general signal processing) is transferred to another task (e.g., cardiac signal data processing) with minimal adjustments.

With continued reference to FIG. 1, in some cases, labeling module 148 may incorporate machine learning assistance, where preliminary segment identifications or labels are suggested, for example, and without limitation, by one or more machine learning algorithms as described herein based on previously labeled data. As a non-limiting example, labeling module 148 may interface with at least a classifier 152 and detector 140 to request, upon receiving time-series data 112 and identifying plurality of time-series segments 132, a machine-generated label for each time-series segment of plurality of time-series segments 132. In some cases, annotating each time-series segment of plurality of time-series segments 132 may include selectively generating, using at least a classifier, at least one segment identification 144 as a default label for each time-series segment of plurality of time-series segments 132. In cases where a plurality of classifiers, each one of the plurality of classifiers implements a different classification algorithm is trained, labeling module 148 may allow user to select, via user interface, at least a classifier of the plurality of classifiers to generate at least one segment identification 144.

With continued reference to FIG. 1, additionally, in real-time signal monitoring, machine learning process as described herein may enhance the efficiency and accuracy of segment labeling process. Processor 104 is configured to generate, using at least a classifier 152, one or more segment identifications at each time-series segment of a plurality of time-series segments subsequently identified using detector based on continuous time-series data 164. As described herein, "continuous time-series data" is a stream of data that is recorded over time without interruption. However, continuous time-series data 164 may include, in some cases, time-series data previously recorded. In other cases, continuous time-series data 164 may include ongoing (physiological) signal recording e.g., ECG or EGM.

With continued reference to FIG. 1, as a non-limiting example, labeling module may process incoming time-series data e.g., ECG data streams continuously. As ECG signal is acquired, it is segmented, by processor 104, into predefined time-series segments and each time-series segment may be immediately passed to interfaced machine learning models e.g., at least a classifier 152. Processor 104 may configure at least a classifier 152 to provide a preliminary label for each time-series segment, indicating for example, and without limitation, potential cardiac events or features, such as arrhythmias, ischemic changes, or normal sinus rhythm in real-time. For example, apparatus 100 as described herein may be used in a cardiac stress test for real-time alerting users e.g., clinicians of abnormal heart rhythms or other issues as they occur, allowing timely intervention.

With continued reference to FIG. 1, in some cases, labeling module 148 may be configured to handle multi-label segment identification as described above, where each time-series segment of plurality of time-series segments 132 may receive, for example, and without limitation, a plurality of labels if necessary. In an embodiment, a single time-series segment of plurality of time-series segments may be labeled as both "low amplitude" and "atrial fibrillation." User e.g., domain expert may create/insert new labels, delete or modify existing labels, and adjusting, in some cases, criteria for classification based on one or more user inputs to ensure machine-generated segment identifications are accurate and relevant; for instance, and without limitation, if a new type of arrhythmia is identified, user may introduce a new label to capture this such condition. Existing labels may be modified to reflect updated identification by appending label of the new type of arrhythmia into the list.

With continued reference to FIG. 1, further, labeling module 148 may also support collaborative labeling efforts, where more than one users may review and annotate the same set of time-series segments. In some cases, labeling module 148 may be configured to track changes and maintain, for example, and without limitation, a history of label modifications. The step of annotating plurality of time-series segments 132 with segment identifications as described herein may be semi-automated. As a non-limiting example, at least a classifier 152 may be used to provide initial label suggestions based on historical labeled data which users e.g., domain experts may then verify and adjust, accelerating the annotation process while maintaining high standards of accuracy through expert oversight. Labeling module 148 may be responsive to latest clinical findings, for example, and without limitation, during an ongoing cardiac monitoring session, if a clinician identifies a new pattern that warrants a specific label, labeling module 148 may immediately incorporate the new label into the real-time analysis pipeline.

With continued reference to FIG. 1, in some cases, labeling module 148 may incorporate feedback mechanism, where the performance of at least a classifier 152 may be continuously evaluated against expert annotations. As a non-limiting example, metrics such as precision, recall, F1-score, and/or any evaluation metrics as described herein may be used to access the performance of at least a classifier 152, the accuracy of machine-generated segment label, and such feedback may be used to iteratively improve the model. Processor 104 is configured to retrain at least a classifier 152 using annotated plurality of time-series segments 132. Over time, at least a classifier 152 may learn from an increasing volume of expert-labeled data (e.g., annotated plurality of time-series segments 132 may be added to labeled training data 156 as described above), leading to more reliable and clinically useful segment identifications.

With continued reference to FIG. 1, retraining at least a classifier 152 may be iterative. In some cases, time-series segments annotated by domain experts using labeling module 148 may be ground truth labels. Ground truth labels may be added to existing labeled training data 156. The expanded dataset may be processed by, for example, and without limitation, converting plurality of annotated time-series segments 132 to canonical data format 128 as described above. Such conversion may involve normalizing signal amplitudes, segmenting or augmenting the data into fixed-length segment, removing artifacts, reducing noise, filtering segments based on a quality threshold, and the like. Processor 104 may load expanded dataset into training pipeline. At least a classifier 152 may then be trained on the updated dataset. During retraining, at least a classifier 152 may map input time-series segments to corresponding labels provided by the experts. In some cases, performance may be again evaluated after retraining. As more time-series data e.g., patient data is collected, additional time-series segments may be identified that were not previously labeled. At least a classifier 152 may be continuously retrained to include new signal features, improving model's accuracy and robustness over time.

With continued reference to FIG. 1, in some embodiments, detector 140 and the at least a classifier 152 may be essentially the same machine learning model, where the at least a classifier 152 may be integrated directly into the U-Net architecture. As a non-limiting example, the at least a classifier 152 may include at least an output layer appended to decoder of 1D U-Net (e.g., plurality of up-sampling layers of the 1D U-Net), wherein the at least an output layer may be configured to generate at least one segment identification 144 using a sigmoid activation function. The sigmoid activation function is used to squash the model's output between 0 and 1, which can be interpreted as probability. This is particularly useful in binary classification problems where we want to interpret the model's output as the probability of belonging to a particular class (i.e., segment identification or label). During training, at least a classifier 152 may generate raw output values that may be used for computing the loss, and applying the sigmoid during testing helps in obtaining probability-like values for generating segment identifications.

With continued reference to FIG. 1, further, using the sigmoid activation function, during testing to retrieve probabilities directly may be more convenient, as our assessment relies on probabilities or necessitates thresholding (e.g., accuracy, precision, recall, F1-score). Post-processing steps may be applied during testing to transform the raw outputs into a more interpretable format such as categorizing each time step using a threshold, and then use the minimum number of time steps (predicted point) to categorize each segment as a single segment identification.

With continued reference to FIG. 1, processor 104 is configured to display a visual representation 160 of the continuous time-series data 164 with the one or more segment identifications on a user interface 168 of labeling module 148. As used in this disclosure, a "visual representation" is a graphical depiction of continuous time-series data that includes annotations, highlights, labels corresponding to identified time-series segments. As a non-limiting example, visual representation 160 may involve plotting continuous time-series data 164 as a waveform, with x-axis representing time and y-axis representing signal amplitude. In some cases, such waveform may provide a real-time or near-real-time view of cardiac signals being monitored. Each time-series segment identified by at least a classifier 152 may be annotated on waveform with segment identifications indicating, for example, and without limitation, the specific cardiac events or signal features. Example annotations may include, without limitation, text labels such as "normal sinus rhythm," "atrial fibrillation," "ventricular tachycardia," "low amplitude," or "noise."

With continued reference to FIG. 1, a "user interface," as used herein, is a means by which user and a computer system interact; for example, through the use of input devices and software. User interface 168 may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface 168 may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. As a non-limiting example, user interface 168 may provide a plurality of interactive features that allow users to, for example, without limitation, to zoom in on specific segments, scroll through the data, select individual annotation or classifier, and/or the like.

With continued reference to FIG. 1, as a non-limiting example, visual representation 160 of continuous time-series data 164 may include one or more segment identifications overlaid on each one of the plurality of time-series segments subsequently identified. These overlays may include, without limitation, text labels, symbols, and color coding to distinguish different types of cardiac events. Time-series segment annotated as "atrial fibrillation" may be highlighted in red with an accompanying text label, while a "normal sinus rhythm" segment may be highlighted in green without text label. In some cases, visual representation 160 may be dynamically updated in real-time as new data is received and processed. For example, and without limitation, as new time-series segments are identified and analyzed, their segment identifications are immediately overlaid on the visual representation. Additionally, or alternatively, each time-series segment may be annotated with detailed annotations e.g., multi-label segment identification that provide additional context and information about the detected event. As a non-limiting example, a segment identified as "ventricular tachycardia" may include one or more annotations indicting the duration of the tachycardia and any relevant waveform characteristics.

With continued reference to FIG. 1, in some cases, visual representation 160 of continuous time-series data 164 may include one or more visual cues such as, without limitation, color gradients, shading, or highlighted borders that can be used to emphasize one or more time-series segments of particular clinical interest. In some cases, visual cues may help users e.g., clinicians to quickly identify associated segment identifications (e.g., critical events) that require further attention. As a non-limiting example, time-series segment with high clinical relevance, such as those indicating potential ischemic events may be highlighted with a bold border and a contrasting background color. Clinicians may click on or hover over segment identifications to view detailed annotations and metadata. Additionally, or alternatively, users may customize visual representation 160 to suit user preferences, for example, and without limitation, one or more options may include filtering which type of segment identifications to display, adjusting the time window shown on the screen (this may involve re-classifying the segment identifications of plurality of time-series segments 132), configuring the appearance of segment identifications to overlay. In an embodiment, clinicians may be able to focus on the most relevant information and streamline their workflow by customizing one or more display settings.

Figure 2A:
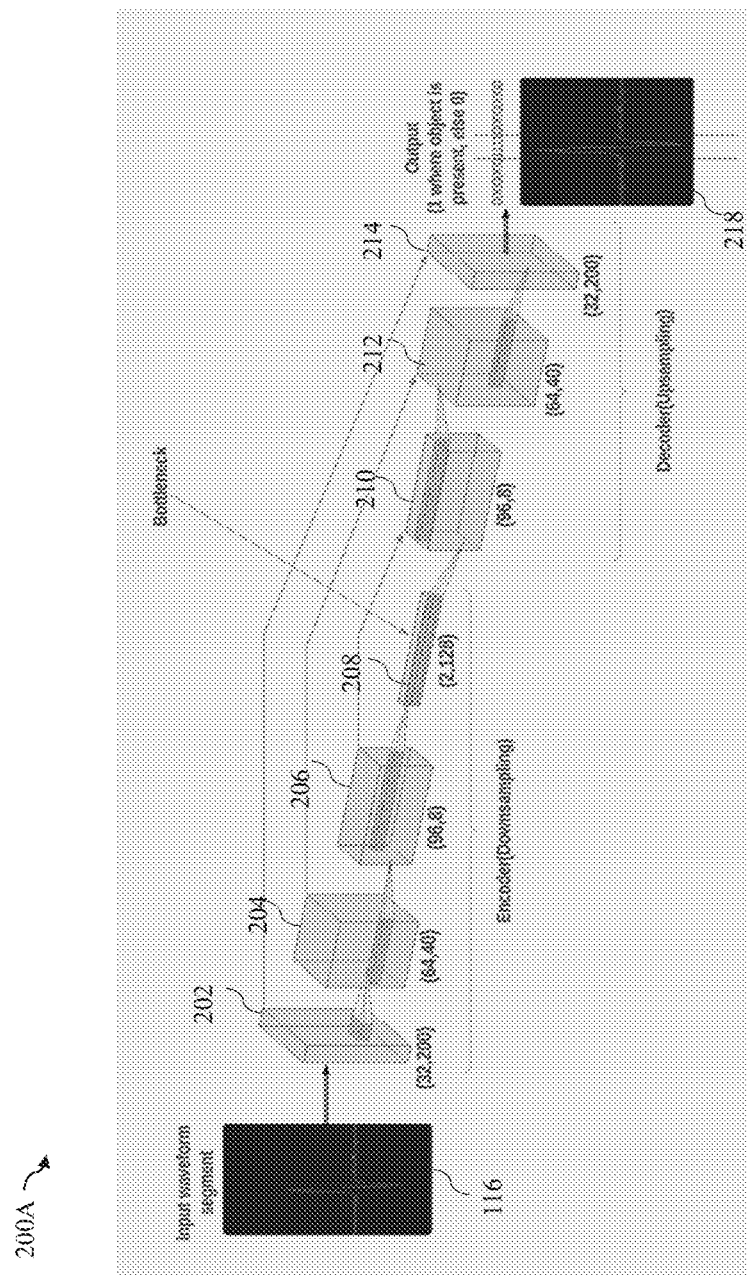
FIG. 2A illustrates a schematic 200A of an example embodiment of a deep learning architecture for detecting an intracardiac signal, in accordance with an example embodiment.

Now referring to FIG. 2A, a schematic 200A of an example embodiment of detector for detecting an intracardiac signal, in accordance with an example embodiment is illustrated. Detector may implement a deep learning architecture. The deep learning architecture may include a down-sampling layer 202, a down-sampling layer 204, a down-sampling layer 206, a bottleneck layer 208, an up-sampling layer 210, an up-sampling layer 212, an up-sampling layer 214.

With continued reference to FIG. 2A, down-sampling layer 202, down-sampling layer 204, and down-sampling layer 206 may be configured to perform encoding on an input waveform segment 216. The bottleneck layer 208 may be configured to perform compression on an output of at least one of the down-sampling layers 202, the down-sampling layer 204, and the down-sampling layer 206. Further, the up-sampling layer 210, the up-sampling layer 212, and the up-sampling layer 214 may be configured to perform decoding on an output of the bottleneck layer 208 to generate an output waveform 218 that may be indicative of the identified time-series segment e.g., detected intracardiac signal.

Figure 2B:
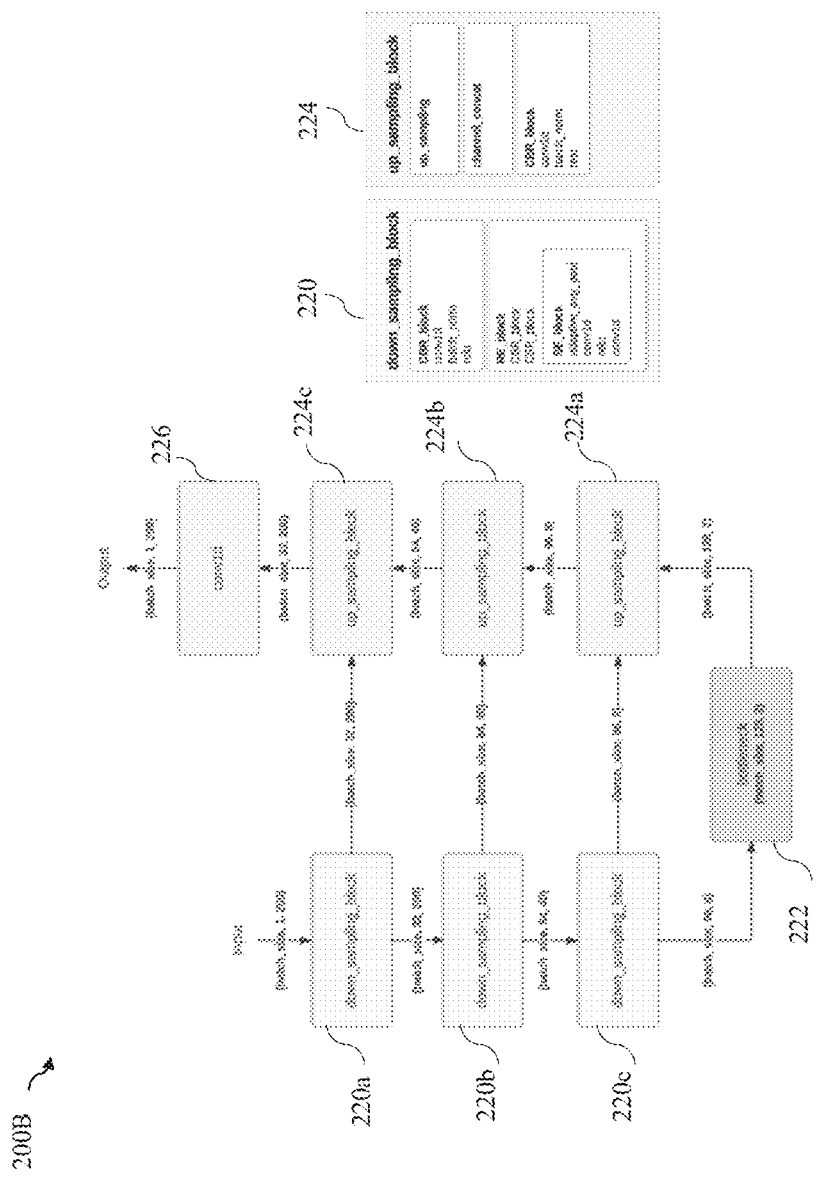
FIG. 2B illustrates a block diagram 200B of deep learning architecture for detecting the intracardiac signal, in accordance with an example embodiment.

Now referring to FIG. 2B, a block diagram 200B of deep learning architecture for detecting the intracardiac signal, in accordance with an example embodiment is illustrated. FIG. 2B is explained in conjunction with elements from FIG. 2A. The block diagram 200B includes a plurality of down-sampling blocks 220, for example, a down-sampling block 220a, a down-sampling block 220b, a down-sampling block 220c, a bottleneck block 222, a plurality of up-sampling blocks, for example, an up-sampling block 224a, an up-sampling block 224b, an up-sampling block 224c, and a convolution1d (conv1d) block 226.

With continued reference to FIG. 2B, in some embodiments, the deep learning architecture may correspond to a one-dimensional (1D) U-Net model. The 1D U-Net model may be a deep learning model specifically configured to perform semantic segmentation tasks. The plurality of down sampling blocks 220 may correspond to a contracting path that is used for encoding. The plurality of up-sampling blocks 224 may correspond to an expanding path that is used for decoding. Further, the U-Net model may include a plurality of skip connections between the corresponding layers.

With continued reference to FIG. 2B, in an embodiment, the deep learning architecture may further include a plurality of custom blocks, a convolution-batch-normalization-rectified-linear-unit (CBR) block, a squeeze-excitation block (SE) block, and a residual (RE) block. The CBR block may include a one-dimensional (1D) convolution layer, followed by batch normalization, and a rectified linear unit (ReLU) activation function. The purpose of the CBR block is to apply a convolution operation to the input feature map, normalize the output, and introduce non-linearity.

With continued reference to FIG. 2B, further, the SE block may adaptively recalibrate channel-wise feature responses by explicitly modelling interdependencies between channels. The SE block may start by applying global average pooling to the input tensor, which helps capture global spatial information by reducing the spatial dimensions. Then, two 1D convolution layers may be used to perform a bottleneck transformation and learn the channel-wise dependencies. Finally, the output of the second convolution may be added to the input tensor using an element-wise addition operation. This operation enables the block to adjust the channel-wise feature responses adaptively based on the global contextual information.

With continued reference to FIG. 2B, the RE block may include two CBR_block layers and a SE_block, followed by a concatenation operation that merges the input and the output of these blocks. The primary goal of the RE block is to learn complex features while alleviating the vanishing gradient problem. The residual connection, formed by the addition operation, allows the model to learn both the identity function and complex feature representations. This helps in training deeper networks, and it's beneficial for the overall model performance.

With continued reference to FIG. 2B, U-Net model may start with several down-sampling layers, which may include the CBR_block and the RE_block layers and may be responsible for encoding the input signal into feature maps. The down-sampling layers may be followed by up-sampling layers that consist of an up-sample operation and the CBR_block layers. The up-sampling layers may be responsible for decoding the feature maps back to the original input size.

With continued reference to FIG. 2B, 1D U-Net model may utilize average pooling layers to pool the input features and concatenate the pooled features with the output of the down-sampling layers. This may help the 1D U-Net model to capture multi-scale information from the input signal. Finally, the 1D convolution layer is used to produce the final output. Finally, a sigmoid activation function is applied to the output to convert the predictions into probabilities.

With continued reference to FIG. 2B, in an example embodiment, the 1D U-Net model may include 4 Encoder (down-sampling) layers, 3 Decoder (up-sampling) layers, and a final output layer. The first down-sampling layer may include a first CBR block, a first RE block, and a second RE block. A second down sampling layer may include a second CBR block, a third RE block, and a fourth RE block. Further, a third down sampling layer may include a third CBR block and a fifth RE block. Further, a fourth down sampling layer may include a fourth CBR block, and a sixth RE block. Further, a first up-sampling layer may include a first up-sample layer, and a fifth CBR layer. Further, a second up-sampling layer may include a second up-sample layer, and a sixth CBR block. Further, a third up-sampling layer may include a third up-sample layer, and a seventh CBR block. Further, a final output layer (i.e. an eighth layer) may include a 1D convolution layer.

With continued reference to FIG. 2B, in an embodiment, the CBR_block may consist of a 1D convolution layer, followed by batch normalization, and a ReLU activation function. The purpose of this CBR_block may be to apply a convolution operation to the input feature map, normalize the output, and introduce non-linearity. The SE_block (Squeeze-and-Excitation Block) may be designed to adaptively recalibrate channel-wise feature responses by explicitly modelling interdependencies between channels. It may start by applying global average pooling to the input tensor, which helps capture global spatial information by reducing the spatial dimensions. Then, two 1D convolution layers are used to perform a bottleneck transformation and learn the channel-wise dependencies. Finally, the output of the second convolution is added to the input tensor using an element-wise addition operation. This operation enables the block to adjust the channel-wise feature responses adaptively based on the global contextual information.

With continued reference to FIG. 2B, the RE_block (Residual Block) may be composed of two CBR_block layers and a SE_block, followed by a concatenation operation that merges the input and the output of these blocks. The primary goal of this RE_block may be to learn complex features while alleviating the vanishing gradient problem. The residual connection, formed by the addition operation, allows the model to learn both the identity function and complex feature representations. This helps in training deeper networks, and it's beneficial for the overall model performance. The U-Net model starts with several down-sampling layers, which consist of CBR_block and RE_block layers and are responsible for encoding the input signal into feature maps. The down-sampling layers are followed by up-sampling layers that consist of an up-sample operation and CBR_block layers. The up-sampling layers are responsible for decoding the feature maps back to the original input size. The model also utilizes average pooling layers to pool the input features and concatenates the pooled features with the output of the down-sampling layers. This helps the model to capture multi-scale information from the input signal. Finally, a 1D convolution layer may be used to produce the final output. At last, a sigmoid activation function is applied to the output to convert the predictions into probabilities.

With continued reference to FIG. 2B, before inference, the 1D U-Net model may have to be trained. To train the the 1D U-Net model, a dataset may be required. In the dataset, the electrogram segments may be labelled as negative samples or positive samples. Among the defined labels Yes and Fusion atrial are considered positive samples and the rest of them are considered negative samples depending on the suggestions of the domain experts. For model input, 200 ms signals are randomly cropped around tagged segments to provide diverse examples.

Figure 3:
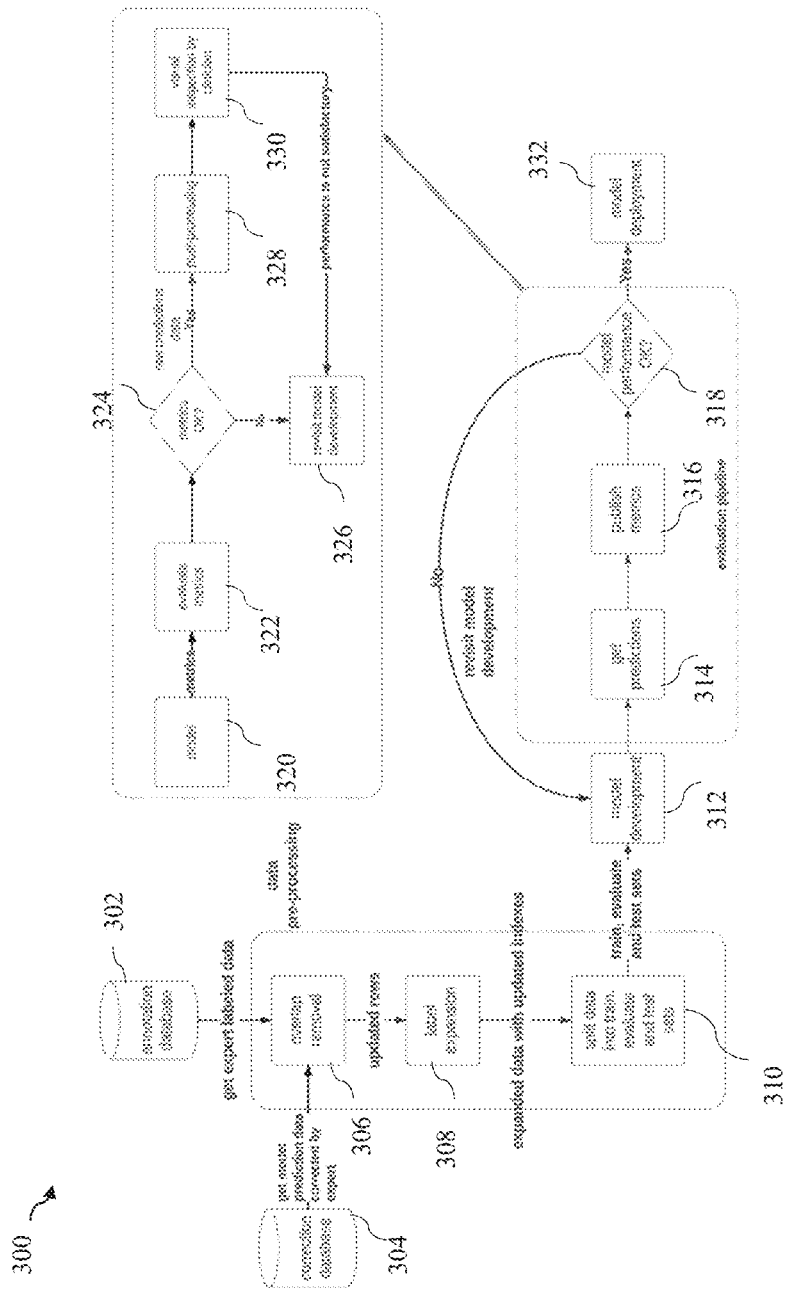
FIG. 3 illustrates a flowchart for the implementation of a model development process 300, in accordance with an example embodiment.

Now referring to FIG. 3, a flowchart for the implementation of a model development process 300, in accordance with an example embodiment is illustrated. At 302, annotated time-series segments (e.g., expert labeled data) is obtained for the data processing process. At 304, model prediction data, in some cases, including one or more preliminary segment identifications, is corrected by the expert and is obtained for the data processing process. At 306, overlapping is removed based on the expert labelled data, and the model prediction data. At 308, a label expansion is performed. For example, without limitation, labels with signal lengths less than a predetermined threshold (typically 300 ms) are expanded to meet this requirement. The script employs an 'extend' factor, calculated as the absolute difference between the expected signal length and the actual length, the labels are adjusted to meet this desired length while maintaining data integrity. If an adjacent label also requires expansion, the script adjusts the label to ensure a continuous signal. Furthermore, if the signal overlaps with the preceding or succeeding label, the expansion is performed to maintain signal integrity. A signal expansion may be performed for the negative categories.

With continued reference to FIG. 3, in an example embodiment, the script may expand the segment to the right based on a determination that a sum of the extend factor and end_index of the current segment is lesser than the start_index of the next segment or a determination that a following segment's label ought to match the one on the current segment. Further, in another example embodiment, the script may expand the segment to the left based on a determination that a difference between the extended factor and start_index of the current segment is greater than the end_index of the previous segment or a determination that the label for the current segment and the preceding segment is matched.

With continued reference to FIG. 3, in another example embodiment, based on a determination that the label expansion is not feasible, or signal length is insufficient, useless data is generated. The script may store label statistics, providing insight into the dataset's characteristics. The label statistics may indicate a total number of labels before and after the expansion process allowing us to assess the impact of the expansion operation. Further, the label statistics may identify the labels with valid signal lengths according to a predetermined criterion. This information is vital for ensuring data quality. Further, the labels that do not meet the defined signal length criteria are flagged as "Invalid Length." The scripts may store the distribution of signal lengths for each label providing a comprehensive view of the dataset.

With continued reference to FIG. 3, at 310, the expanded data with updated indexes is split into training dataset, evaluating dataset, and test dataset. The splitting is primarily based on whether the data belongs to specified test cases. This ensures that the dataset is split into components suitable for model training, evaluation, and testing. Further, a shuffling operation ensures randomness in the order of data within the training and test sets. This process mitigates any potential bias introduced during data collection or labelling. Finally, the script saves the processed label data to JSON files in the designated output directory. The saved data can subsequently be utilized in machine-learning experiments.

With continued reference to FIG. 3, a data loader is created specifically to load, preprocess, and get data ready for model training. and offers further features including negative sample generation and class-based filtering. The parameters "pos_class" and "neg_class," which stand for positive class and negative classes are initialized based on the information supplied. The pos_class is associated with the yes label, the fusion atrial label, and the like. The neg_class is associated with the no label, the fusion ventricular label, the degraded label, the low-amplitude label, the pacing label, the noise label, the future consideration, and the like.

With continued reference to FIG. 3, based on generating an instance of this class takes in a number of arguments to customize its behaviour, including data, sig_len, negative_ratio, mode, and others. The dataset intended signal length, ratios for negative samples, mode of operation, and other factors are all controlled by the parameters. Further, the data loader loads a list of data points (pid_list) from a JSON file based on the provided data and mode. It further processes the loaded pid_list Optionally by applying additional filters based on parameters like case, anatomy, and other conditions. The data loader adjusts the pid_list based on positive and negative classes and calculates the sizes for negative samples based on the specified ratio then generates negative samples based on the calculated sizes.

With continued reference to FIG. 3, based on a determination that the log attribute is set to True; it prints various statistics and information about the dataset, including the number of positive samples, negative samples, valid samples, and other details. Further a weightage calculation (WRS) operation may overcome an issue of class imbalance by assigning higher weights to under-represented classes, ensuring that the model pays more attention to those classes during training. Weights are calculated based on the inverse of the class frequencies.

With continued reference to FIG. 3, a class weight calculation is performed by using a get_weights method to calculate class weights based on the distribution of classes in the dataset. It helps to address class imbalance by assigning different weights to different classes. Further, a _getitem_ method allows you to access individual data points from the dataset. It retrieves the details of a data point, such as the file, vein, lead index, start and end indices, and the label. It then loads the signal data associated with the data point and applies data augmentation, if required. If meta is set to True, it returns additional metadata along with the signal data and labels.

With continued reference to FIG. 3, further, the code calculates how much padding (extra data) is needed to make the length of the signal equal to a specified length called Sig_len i.e. 300 ms, two variables, padding_left and padding_right, are initially set to zero. These will be used to determine how much padding is added to the left and right sides of the signal. If the code is in training mode (a mode used to improve the model's performance), it randomly selects an amount of padding between a minimum value (min_padding=0) and the remaining padding required. This random padding is assigned to the padding_left variable. This randomization helps augment the data for training by introducing some variability, and if the mode is other than training, the padding_left is set to half of the remaining padding. This helps center the signal within the specified length (sig_len), making sure it's not biased to one side.

With continued reference to FIG. 3, the code then selects the portion of the signal that falls between the updated start and end indices, effectively removing or adding padding as needed. This cropped signal is stored in the crop variable. If the length of the cropped signal (crop) is still greater than the desired sig_len, further adjustments are made. In training mode, a random start index is selected within the valid range to keep the signal length equal to sig_len. In other modes, the start index is adjusted to center the signal within sig_len. If the length of the cropped signal (crop) is still not equal to sig_len, zero padding is applied to the right side of the signal to make its length match sig_len. If the mask option is enabled, a binary mask is created. This mask is a way to highlight specific regions of the signal. If the data point belongs to the positive class, the region between padding_left and (end_idx−start_idx)+padding_left is set to 1 in the mask. The mask is then reshaped into a 1D array and returned along with the cropped signal. If the mask option is not enabled, the function returns the processed (cropped) signal without the mask.

With continued reference to FIG. 3, at 312, the model is developed based on the training dataset, evaluating dataset, and test dataset. At 314, predictions are obtained by using the model. At 316, metrics are published via the evaluation pipeline. At 318, a determination is made whether the model performance is accurate or not. If the model performance is not accurate, the model is re-developed. Further, at 320, the model may send the metrics for the evaluation. At 322, the metrics are evaluated. At 324, a determination is made whether the metrics are accurate or not. If the metrics are not accurate, then at 326, the model is re-developed. If the metrics are accurate, then, at 328, post-processing is performed on the raw prediction data. At 330, a visual inspection by the clinician is performed. Further, if the model performance is accurate, then at 332, the model is deployed.

Figure 4A:
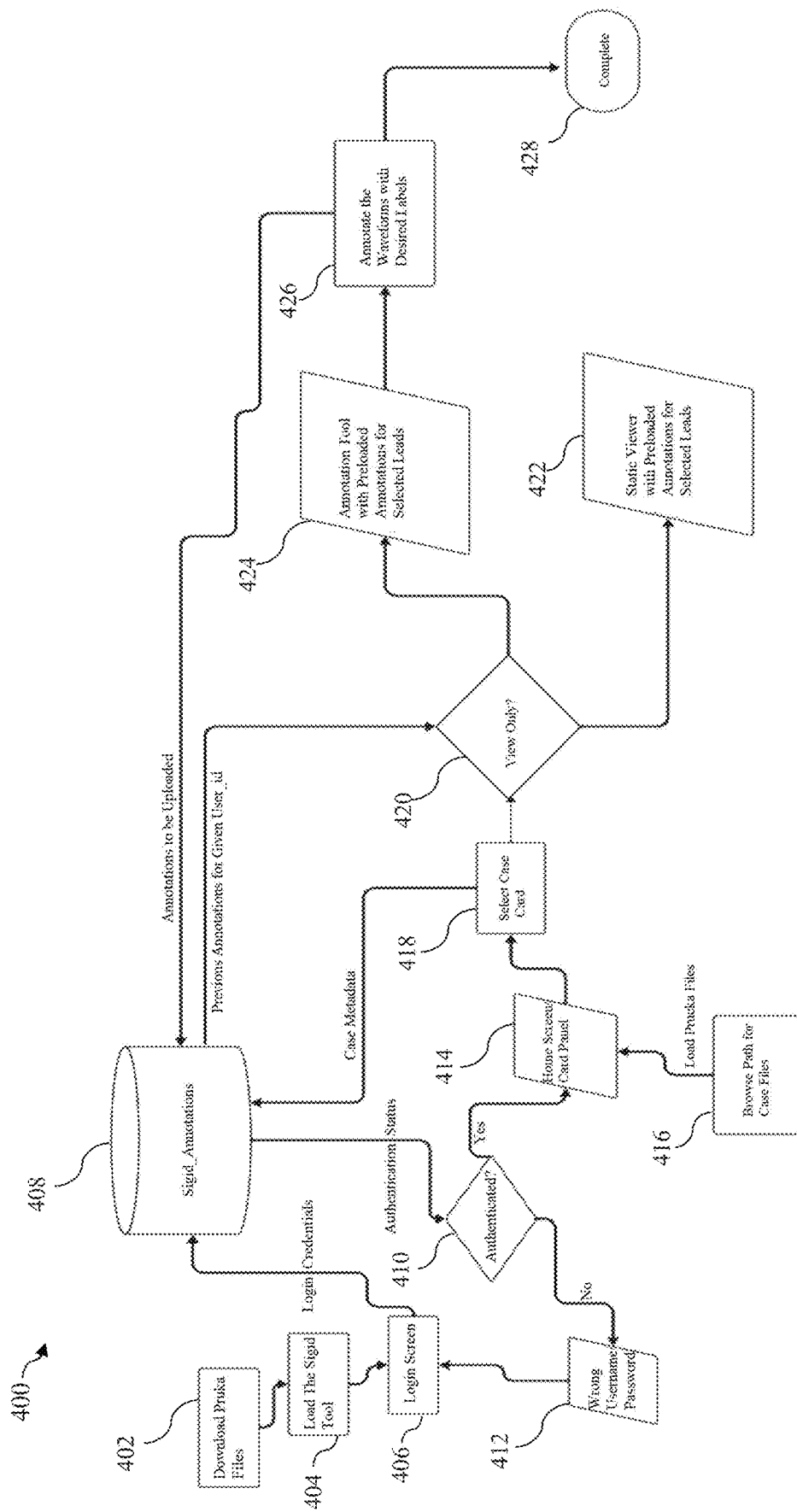
FIG. 4A illustrates an exemplary flowchart 300A for user authentication, in accordance with an example embodiment.

Now referring to FIG. 4A, an exemplary flowchart 400A for user authentication, in accordance with an example embodiment is illustrated. Labeling module as described herein may include labeling tool that is a QT user interactive application which allows one or more users to label the selected segment of the signal to a particular segment identification or label. The labeling tool also acts as a historical case viewer where the predictions from the model can be loaded into the labeling tool and can be viewed in tandem with the ground truth to compare the quality of the prediction at a visual level.

With continued reference to FIG. 4A, at 402, one or more case files, for example, pruka files are downloaded. Further, at 404, an underlying system may be loaded, for example, the executable instruction for the labeling of the one or more intracardiac signals may be loaded by the underlying system. At 406, a user login interface is loaded. Further, the user login interface may be configured to receive login credentials, for example, a username, a password, and the like. At 408, a database may be configured to store the login credentials. Further, at 410, a determination is made whether the received credentials are valid or not. If the user credentials are not valid, then at 412, instructions for the loading of the user login interface are loaded. Further, if the login credentials are valid, at 414, a case user interface for selecting one or more case portions is displayed. Additionally, at 416, pruka files may be received by the underlying system for the labelling of the one or more cardiac signals. Further, at 418, each portion of the one or more case portions may receive a user input to display the one or more intracardiac signals associated with the one or more case portions. Further, at 420, a determination is made whether there is a need to change the signal label associated with the one or more cardiac signals. If the change is not required, then at 422, a static view of the cardiac signals with predetermined correlated signal labels is displayed. Additionally, the underlying system operates to create the prediction data in the form that can be viewed in the visualization tool. The ground truth is the data that is already provided by the clinician for the particular waveform segment. The bin files for the cases are produced where leads don't have any suffix at the end of the bin file indicating the file or waveform belongs to ground truth. Further, the prediction data where prediction is done on the selected segments of the waveform data for a case. These segments are usually the same windows that are annotated by the clinicians. Further, the underlying system may convert the SoftMax scores into the class labels that the model has predicted. During the pre-process for training data, the length of the segment undergoes the expansion to make it to value that can be fed to the model. This results in the new start index and end index relative to the old start and end index.

With continued reference to FIG. 4A, indexes may be used as new start and end while saving the prediction to see what the model sees to extract features during prediction. The leads for these data are stored with the suffix _m to indicate the model prediction. The output of the real-time streaming or simulation to predict PVPs is stored in the CSVs. The difference between segment-wise and real-time is in real-time whole segments of data are simulated in the form of batches of length 200 and prediction is made on it. In the next iteration, there is an overlap of the 100 ms data to overcome some corner or edge cases. The start index and end index for each of the segment masked by the model is saved with leads suffixed with _R indicating predictions from real-time annotations. At 424, to view the data in the labeling tool, all formats of data mentioned above should be stored in the labeling tool table where annotations are recorded under the model's name as user which has its unique ID. Prepare bin files for the cases you want to view with lead, one with suffixed _m and one with suffixed _R. load these cases in the labeling tool and you can compare the accuracy in the quality of predictions made by the model in segment-wise and real-time prediction (static view) compared with ground truth. However, if there is a need for the change of the signal label, then, at 426, the one or more intracardiac signals are labelled based on a user input. Further, at 428, a user input is received indicative of the completion of the labeling of the one or more intracardiac signals.

Figure 4B:
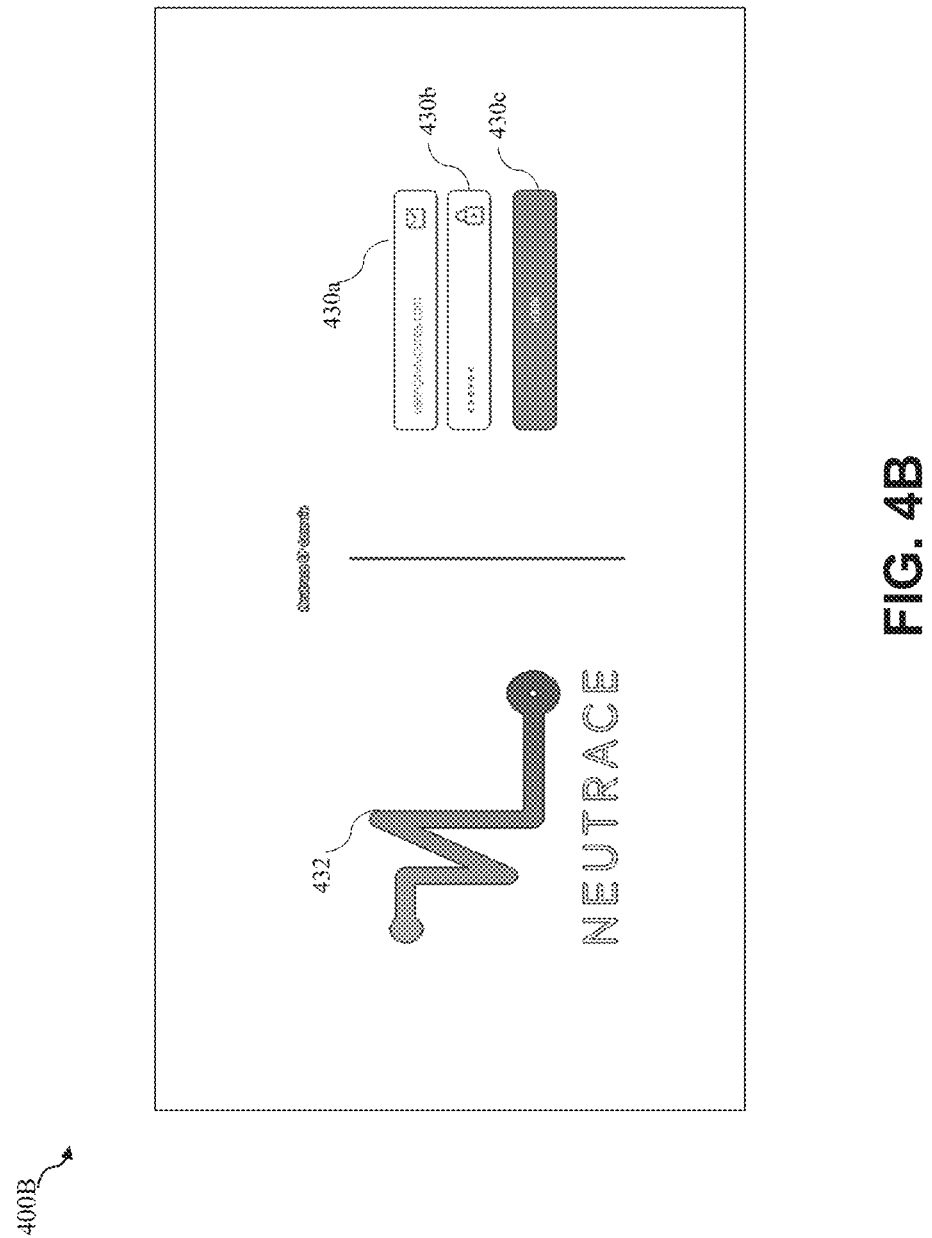
FIG. 4B illustrates a user interface 300B for user authentication, in accordance with an example embodiment.

Now referring to FIG. 4B, a user interface 400B for user authentication, in accordance with an example embodiment is illustrated. The user interface 400B includes a username option 430a, a password option 430b, a login option 430c, and a logo 432. The username option 430a may be configured to receive a user input indicative of a username. Further, the password option 430b may be configured to receive a user input indicative of a password. Further, based on the username and the password, the login option 430c may be configured to perform the user authentication. Further, the user interface 400B may be configured to display the logo 432.

Figure 4C:
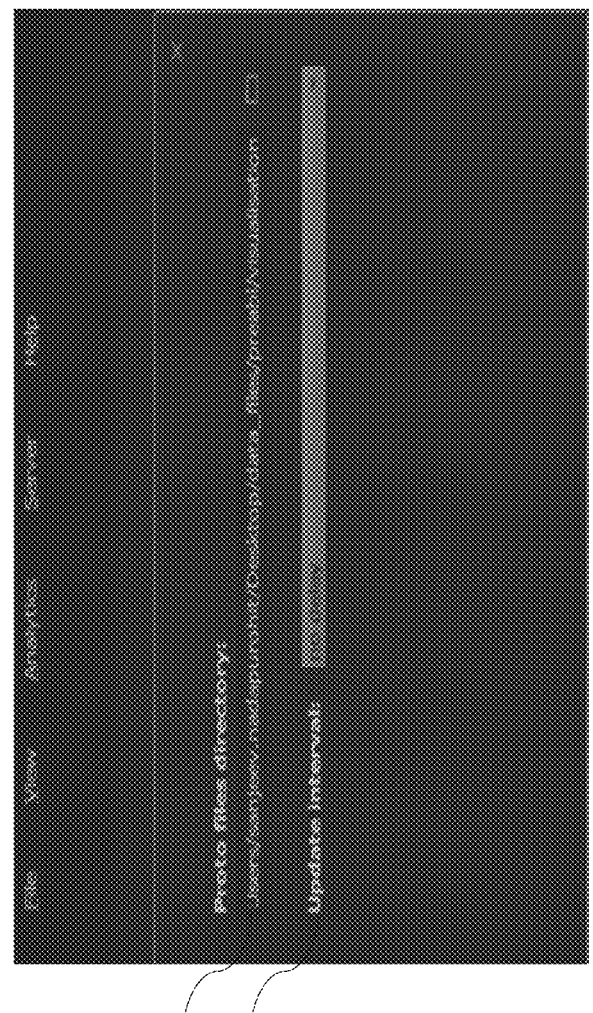
FIG. 4C illustrates a user interface 300C for displaying a case directory, in accordance with an example embodiment.

Now referring to FIG. 4C, a user interface 400C for displaying a case directory, in accordance with an example embodiment is illustrated. The user interface 400c may include a proto files directory option 434, and an update interval option 436. The proto files directory option 434 may be configured to receive a user input indicative of a selection of a proto file. Further, the proto files directory may be configured to display a path corresponding to the selected proto file. Further, the update interval option 436 may be configured to display an updated interval corresponding to an update associated with the proto file.

With continued reference to FIG. 4C, in an embodiment, once the user provides the login credentials, the then the initial home page is loaded with several functionalities for the user. The clinician has to press the server options which allows the user to select the path where zip files are stored. Once the refresh button is pressed the path to access files is set and the panel card view appears for each case, hovering over which displays the metadata for the corresponding case.

Figure 4D:
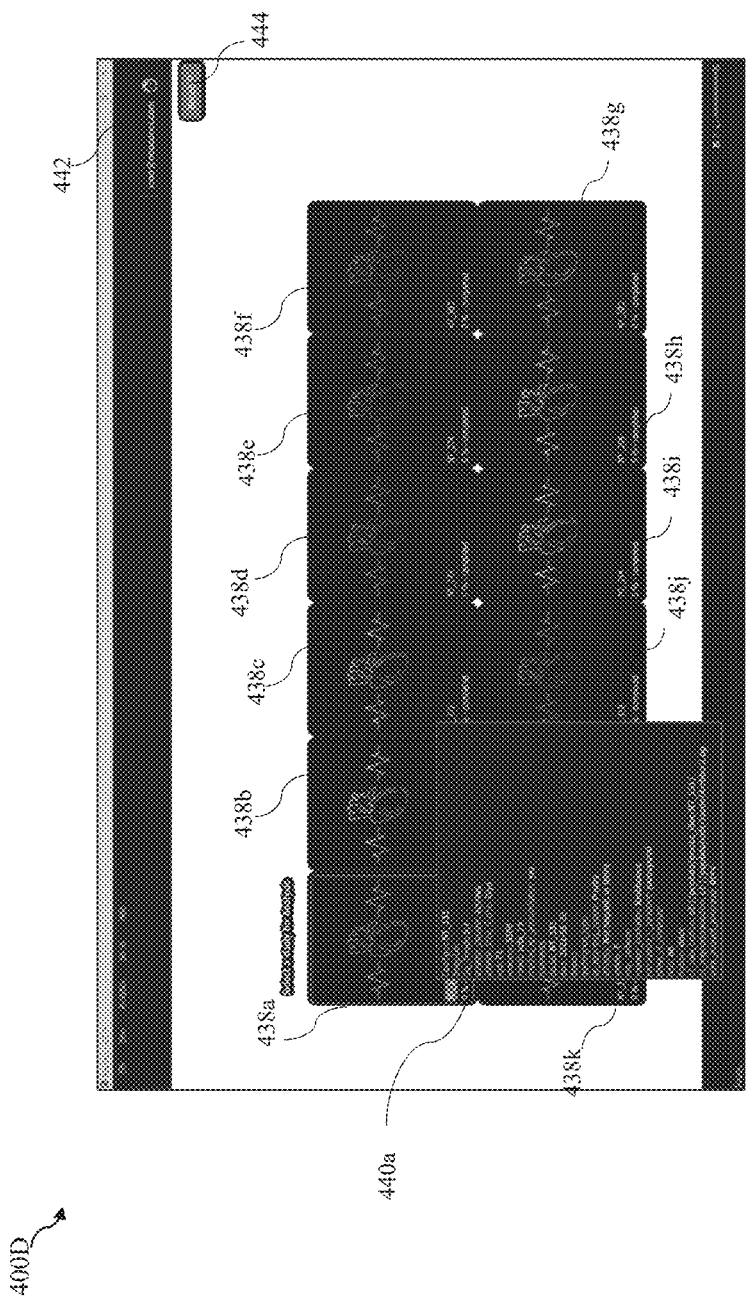
FIG. 4D illustrates a case user interface 300D for selecting one or more case portions, in accordance with an example embodiment.

Now referring to FIG. 4D, a case user interface 400D for selecting one or more case portions, in accordance with an example embodiment is illustrated. The one or more case portions may include a case portion 438a, a case portion 438b, a case portion 438c, a case portion 438d, a case portion 438f, a case portion 438e, a case portion 438g, a case portion 438h, a case portion 438i, a case portion 438j, a case portion 438k, a user id option 442, and a refresh option 444. The one or more case portions may be configured to display a case symbol, a case ID, and a case analysis percentage. Further, the one or more case portions, for example, the case portion 438a may be configured to display a case summary portion, for example, a case summary portion 440a. The case summary portion 440a may display at least one of: a case type data, an image URL data, a sig_thresh data, an ablation catheter data, ablation type of cryo data, age data, anatomy data, caseid data, checked for anonymization data, comments data, dataid data, date data, display data, electro gram type data, ep_recording_system data, ethnicity data, gender data, map catheter data, operator institution data, paroxysmal v persistent data, phase of procedure data, redo data, rhythm data, s3 data location data, s3 original data location data, and veins involved annotated data. Further, the user ID option 442 may be configured to display a user ID. Further, the refresh option 444 may be configured to display the case user interface iteratively.

With continued reference to FIG. 4D, once the clinician selects the case the unique identifier is registered in the case data table. Also in the study case table, the one-to-one map between the user and the case is created. The leads present in the case are recorded along with the pointer for the last sample index the clinician went through in the case. If there are previous annotations made clinicians are also loaded along with the waveform data.

Figure 4E:
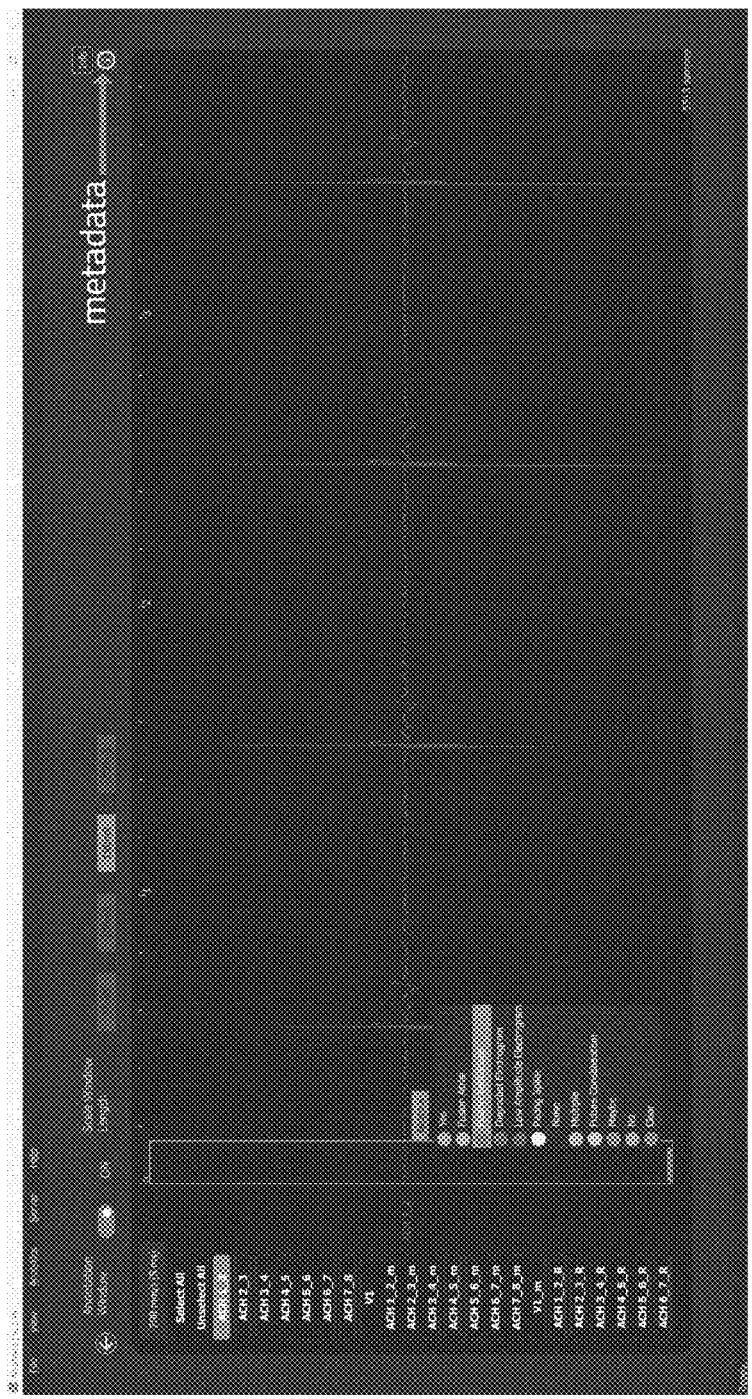
FIG. 4E illustrates a case user interface 300E for selecting one or more segment identifications, in accordance with an example embodiment.

Now referring to FIG. 4E, a user interface 400E for selecting one or more segment identifications, in accordance with an example embodiment is illustrated. There are various options that are available such as Leads which allows the user to select the lead he wants to annotate, Sweep speed which allows the user to select the paper speed at which the waveforms can be displayed, Metadata which allows the user to hover over the exclamation point and check the case related information, Annotation window button that allows the user to either view or edit the labels, Previous & next that allows the user to go to previous label or next label, Class labels—on the left click of the mouse, and Annotation Window length that allows the user to select the size of 50, 100, 150, 200. Labels may include any segment identification as described herein, such as, without limitation, "Yes," "Fusion Atrial," "Fusion Ventricular," "Degraded Electrogram," "Low Amplitude Electrogram," "Pacing Spike," "Noise," "Multiple," "Future Consideration," "Maybe," "No," "clear," and the like.

Figure 4F:
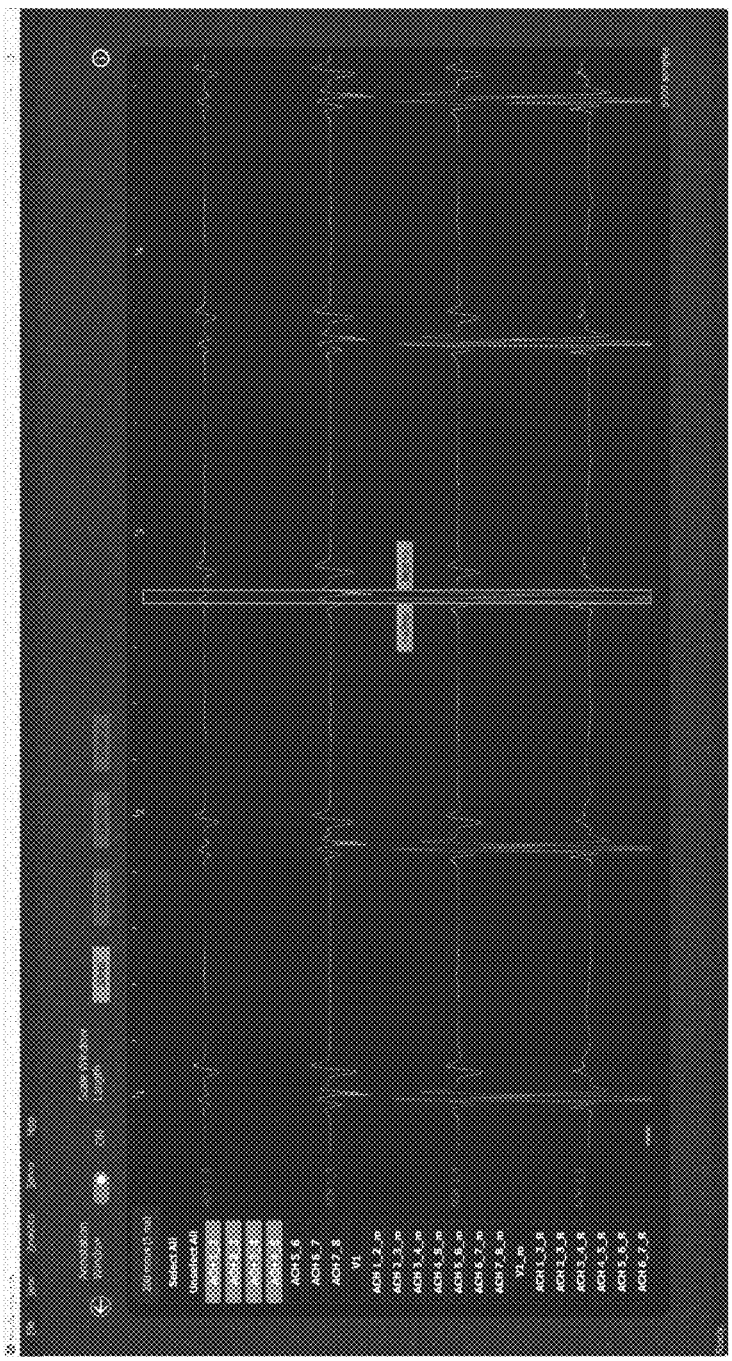
FIG. 4F illustrates a case user interface 300F for navigating between time-series segments, in accordance with an example embodiment.

Now referring to FIG. 4F, a user interface 400F for navigating between time-series segments, in accordance with an example embodiment is illustrated. Once the annotation is provided by the clinician in the user interface, then the annotation is stored in the labelling tool database where each label along with its length, position of lead, and time of recorded label. Clinician may click previous button or next button to navigate between adjacent time-series segment within time-series data.

Figure 4G:
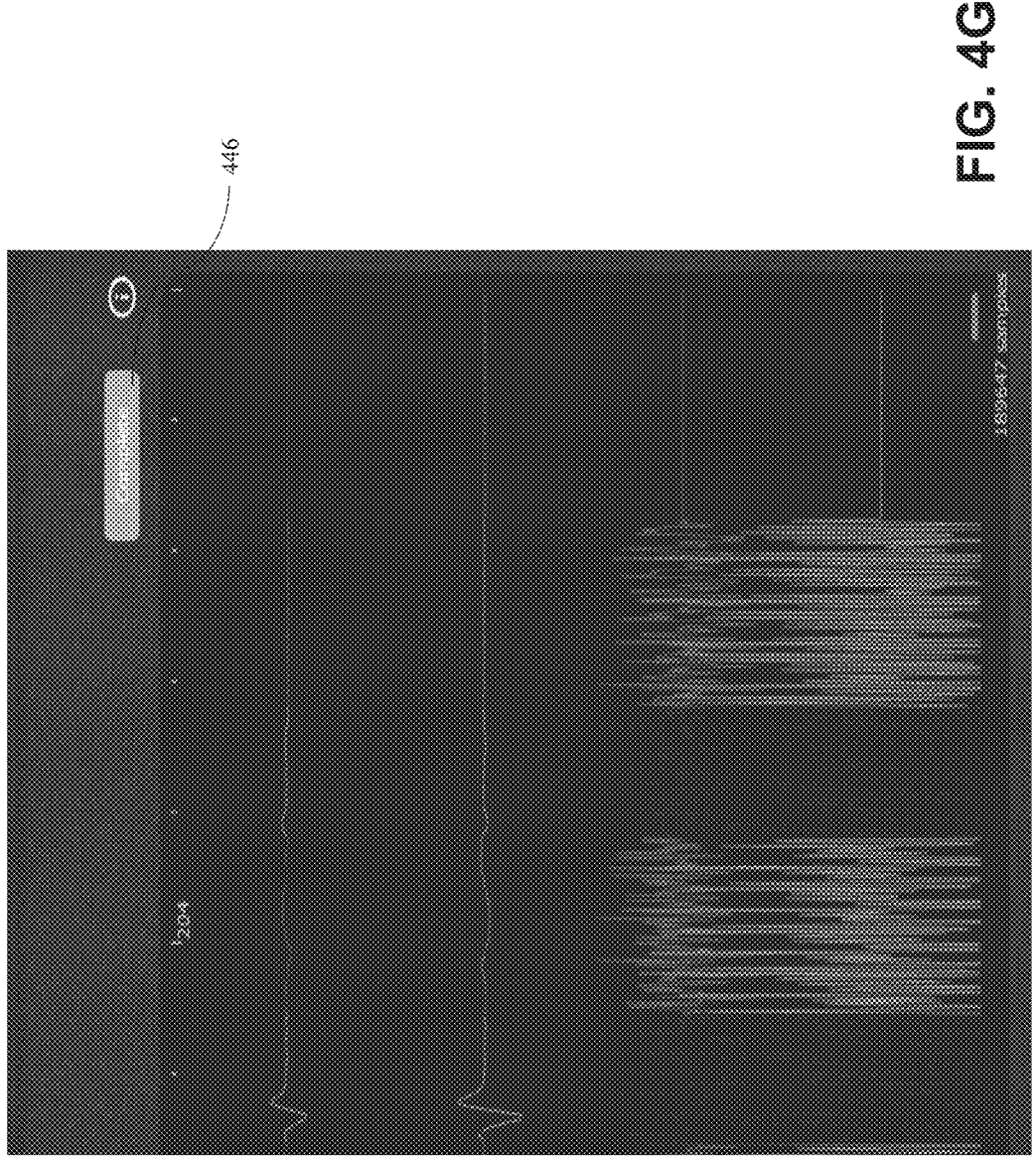
FIG. 4G illustrates a case user interface 300G for completing annotation of cardiac signals, in accordance with an example embodiment.

Now referring to FIG. 4G, a user interface 400G for completing time-series segment annotation, in accordance with an example embodiment is illustrated. Once the annotation and scanning of the case is completed by the clinician. The clinician may be allowed to press the complete button 446 where it is recorded in the database that the clinician has reached the end of the data.

With reference to FIGS. 4A-G, in another embodiment, another use of the labelling tool as described herein is that it can be used for visualizing the prediction labels from the model. Following are the steps to load the data into the visualization tool. The first step is preprocessing which includes a Segment-wise Evaluation, and a Real-time prediction step. The second step is loading the database and viewing it in the tool.

With reference to FIGS. 4A-G, in the preprocessing, a block of code performs the operation of creating the prediction data in the form that can be viewed in the visualization tool. The following are the types of data: Ground truth. The ground truth is the data that is already provided by the clinician for the waveform segment. The bin files for the cases are produced where leads do not have any suffix at the end of the bin file indicating the file or waveform belongs to ground truth.

With reference to FIGS. 4A-G, in the Segment-wise Evaluation, we store the prediction data where prediction is done on the selected segments of the waveform data for a case. These segments are usually the same windows that are annotated by the clinicians. We convert the SoftMax scores into the class labels that the model has predicted. During the preprocess for training data, the length of the segment undergoes the expansion to make it to value that can be fed to the model. This results in the new start index and end index relative to the old start and end index. These indexes are used as new start and end while saving the prediction to see what the model sees to extract features during prediction. The leads for these data are stored with the suffix _m to indicate the model prediction.

With reference to FIGS. 4A-G, in the real-time prediction, the output of the real-time streaming or simulation to predict pvps is stored in the csvs. The difference between segment wise and real time is in real-time whole segments of data are simulated in the form of batches of length 200 and prediction is made on it. In the next iteration, there is an overlap of the 100 ms data to overcome some corner or edge cases. The start index and end index for each of the segment masked by the model is saved with leads suffixed with _R indicating predictions from real-time annotations.

With reference to FIGS. 4A-G, in the second step i.e., Loading in the database and viewing in the tool, to view the data in the labeling tool all formats of data mentioned above should be stored in the labeling tool table where annotations are recorded under the model's name as user which has its unique id. Prepare bin files for the cases you want to view with leads as it is in .inf, one with suffixed _m and one with suffixed _R. Load these cases in the labeling tool and processor may compare the accuracy in the quality of predictions made by the model segment-wise and real-time prediction (static view) compared with ground truth.

Figure 5:
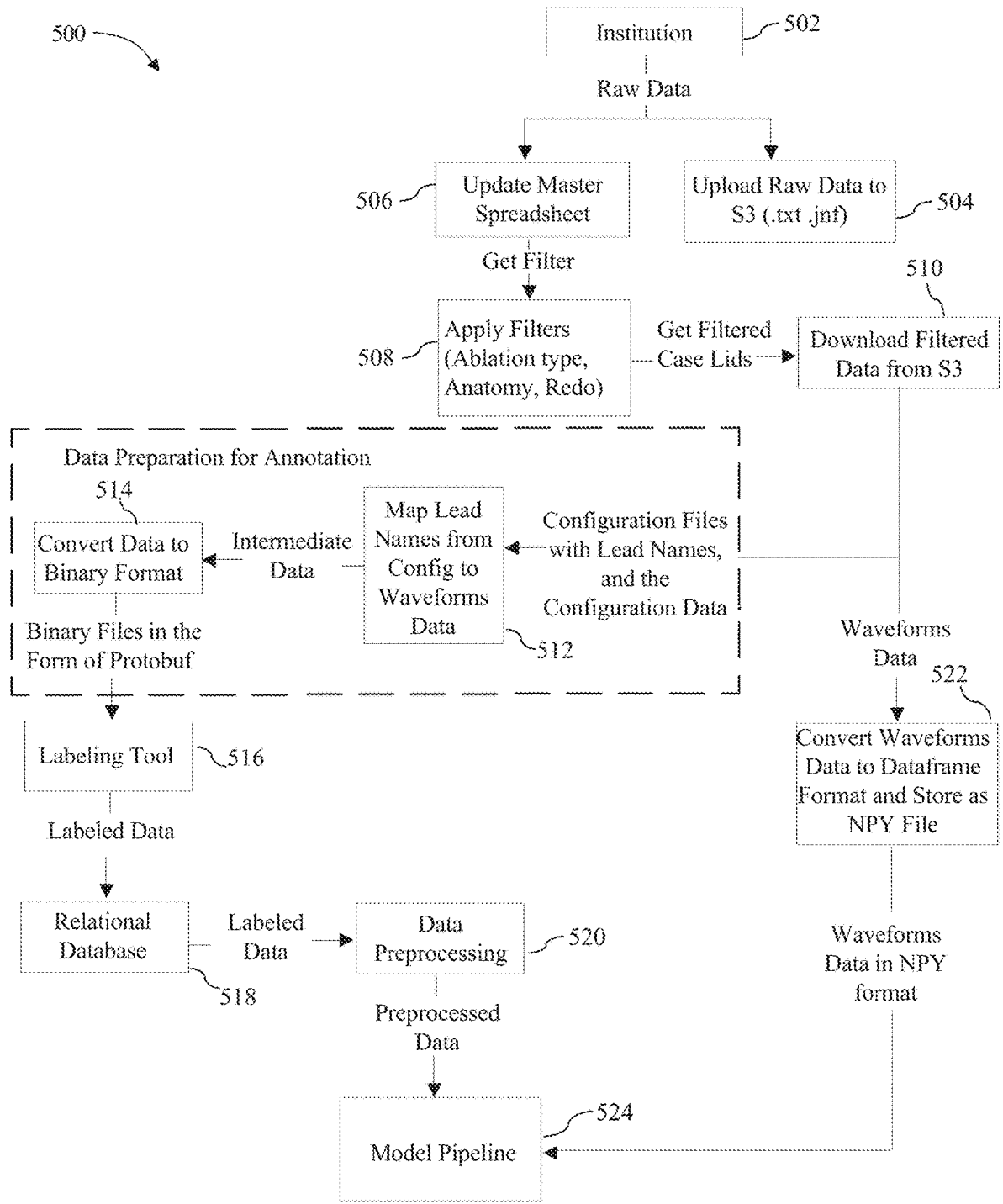
FIG. 5 illustrates a flowchart for implementation of a data validation and standardization process, in accordance with an example embodiment.

Now referring to FIG. 5, a flowchart for implementation of a data validation and standardization process 500, in accordance with an example embodiment is illustrated. At 502, raw data is received from the institutions. At 504, raw data is uploaded to S3 (.txt, .jnf, etc.). At 506, a master spreadsheet is updated. At 508, filters, for example, an ablation type filter, and an anatomy rhythm, redo are obtained, and applied on the updated master spreadsheet. At 510, filter data may be downloaded from S3.

With continued reference to FIG. 5, the script systematically filters out labels that do not adhere to specific criteria. For example, the scripts may filter out invalid anatomy. The Labels associated with anatomies denoted as Left Atrial Appendage (LAA) or 'POST_WALL' are excluded from the dataset. This exclusion ensures that only data with clinically relevant anatomies are considered. The scripts may filter out invalid signal length labels. For example, the labels with signal length less than 40 ms for positive categories and less than 150 ms for negative categories are omitted from the dataset. This step ensures that the data is valid and with proper labels.

With continued reference to FIG. 5, at 512, map lead names are converted to configuration files. Further, the configuration files are converted to waveform data. At 514, the waveform data is converted to a binary format. At 516, the labeling tool receives binary file in the form of protobuf. At 518, labeled data is stored in a relational database. At 520, a data processing is performed on the labeled data. At 522, the waveforms data is converted to a data frame format and stored as npy file. At 524, the model pipeline receives the preprocessed data, and the npy file.

Now referring to FIG. 6, tables for case id and case metadata, in accordance with an example embodiment 600 is illustrated. There is shown a case_data table 602, and a case_metadata table 604. The case_data table 602 helps to track the metadata of the cases that are pre-processed for annotators to be labeled. It contains meta information i.e. university the case belongs to, if the patient is reappearing for procedure or not, the anatomy, nature of arrhythmia and location of the prucka data in AWS. The data is downloaded using the secure channel that prevents the leakage of sensitive data and produces the logs for the data accessed. The primary key of the case_data table 602 may be DataID (varchar) that may be a unique id for the case assigned.

With continued reference to FIG. 6, the case_metadata table 604 helps to identify the cases that have been updated in the case data and have been downloaded from S3. The case_metadata table 604 has a data id that acts as primary key that references the DataID field in case_data table 602.

With continued reference to FIG. 6, this case_metadata table 604 also tracks the information about the files that have been converted from the raw text files to the binary format (i.e. protobuf files) allowing our labelling tool, Neutrace, to read the files and allows the clinician to label the data which serves as the training data for the detection algorithms, The table also stores the timestamp and status of the data upload. The case_metadata table 604 may have a Primary key id(varchar) that may be a unique ID for each record, and a foreign key case_id(varchar) that may connect to the case_id in case_data.

With continued reference to FIG. 6, in conversion from Text files to Protobuf files step, processor may check the case_metadata table for the cases to be downloaded and they are checked for the .txt and .inf files in them, as both of these files are necessary for the workflow to run. Once the cases are downloaded, they are converted into an intermediate representation, i.e. tables with channel names as columns and recorded voltage value at a given instant as the rows. This data is later broken into batches of 6000 ms. This process is repeated for each channel across all the data points for each case. These are finally converted to protobuf (a language-neutral, platform-neutral extensible mechanism for serializing structured data) and then encoded and converted to a binary representation. A JSON file consisting of a subset of the case_data table 602, is deposited per case for the reference of the clinicians. Unit tests to validate that the data from prucka files (original case data) match with the final binary files (protobuf) were conducted successfully during this stage.

With continued reference to FIG. 6, during data loading, final protobuf bin files may be compressed and uploaded to S3 with their respective case numbers. The upload process is carefully designed in such a way that there is a logic to attempt the upload multiple times in case of failure. Only once the number of attempts exceeds the configured retry-limit, the upload will be marked as Failure in the database and the process is aborted. The number of cases that go into each compressed file is configurable and is used throughout the process. These zip files are accessible only to the clinicians. Once processor get a status message that states that the upload is complete, the logs and meta information about status of the zip file, status of the upload, its location, cases contained in it and time of upload, is stored in another table called "bin_data".

With continued reference to FIG. 6, files deposited in S3 which contain pre-processed protobuf files may be downloaded by the clinician during annotation step. The clinician then scans through the case segments and annotates the waveform with the choice of labels given. The annotation is based on the domain expertise of the clinician. The labels can be of these variable lengths such as 50 ms, 100 ms, 150 ms, 200 ms, and like. The segment length is determined by various statistical analyses that are performed pre-hand. Most PVP signals fall under the segment length of 50 ms with very few surpassing these values. The labels are broken down into various categories on the basis of suggestions from various domain experts. Examples of labels are Yes, no, not sure, Fusion Atrial, Fusion Ventricular, Degraded Electrogram, Low Amplitude Electrogram, Pacing Spike, Noise, Multiple, Future Consideration, and Clear (delete the label).

With continued reference to FIG. 6, to manage the labelled data coming from the clinician, processor may use the following tables in the AWS RDS schemas—Case data table—The table is loaded with the metadata of all the cases sent to the clinicians. Each case is given a unique id which acts as the primary key to the table. The primary key of this table is Id (varchar) that is assigned to each case.

With continued reference to FIG. 6, database may include a User table—Each clinician or labeler is given a unique user id. This id is later mapped to the case that the clinician is labeling in the study case table. The table also contains the meta information about user like the username, the password's hash and the type (for example if clinician its 2, for tester its 1, used for testing the pipeline). The primary key of this table is id(varchar)—id for user.

With continued reference to FIG. 6, database may include a study case table—This table maps the user id and the case_data id during the process of annotation. It has a field id which acts as a unique key for each map. It also has the foreign key case_data id and the user_id. The Id—unique study_case (map id). The User_id-foreign key that joins studycase table to user table and Casedata_id—foreign key that joins the studycase table to the casedata table.

With continued reference to FIG. 6, database may include a labels table-Provides the unique id to the labels pre decided for segments. Each label has a unique categorical ordering id. Id(int)—label id With continued reference to FIG. 6, database may include an annotation table—The tool connects all three to the labeling that the clinician has done. It has a unique id for each label provided by the clinician, and it has a studycase_id that connects annotation table record to study case. It also has the time when a particular segment was labeled. The primary key may-unique id for each record in the labeling tool.

Now referring to FIGS. 7A-E, exemplary user interfaces 700a-e associated with labeling tool for labeling cardiac signals are illustrated. Steps that clinician follows may include logging to user profile and load the data into the tool as shown in UI 700a. After loading the data, the panel for each case appears on the home screen as shown in UI 700b. The clinician selects the panel of the case you want to open. It displays the EGM and ECG data for case along with an option to change segment length and the lead to annotate. It also allows changing the sweep speed. This is shown in UI 700c. In some cases, the Logic to calculate the percentage of completion is Percentage of completion=Position of the current waveform (index)/Total length of the waveform. The clinician selects the segment and press the left mouse button and label options appear. Select the label and it gets stored in the database. Unit tests were successfully conducted to check the label loading and its association accuracy as shown in UI 700*d*. The annotation is later stored in the database under his username association. (The login was done securely that allows data leak and secure access).

With continued reference to FIGS. 7A-E, in Post processing Visualization, the labeling tool provides the special feature where the user can load the predictions done by the model in both segment-by-segment evaluations and also in the shifting window format where the evaluation which model predicts on shifted by the signal length and predictions is made on it. Once loaded, the tool allows the user to make comparisons between the ground truth and evaluation results providing the visual quality check for the predictions done by model in both scenarios. The post procedure has two formats Evaluation for selected segments only, and Evaluation for whole data in shifting window format (i.e. Static Segment Evaluation). Once the predictions are uploaded, they are displayed in the tool where the clinician can visualize them as displayed in UI 700*e*.

Figure 8:
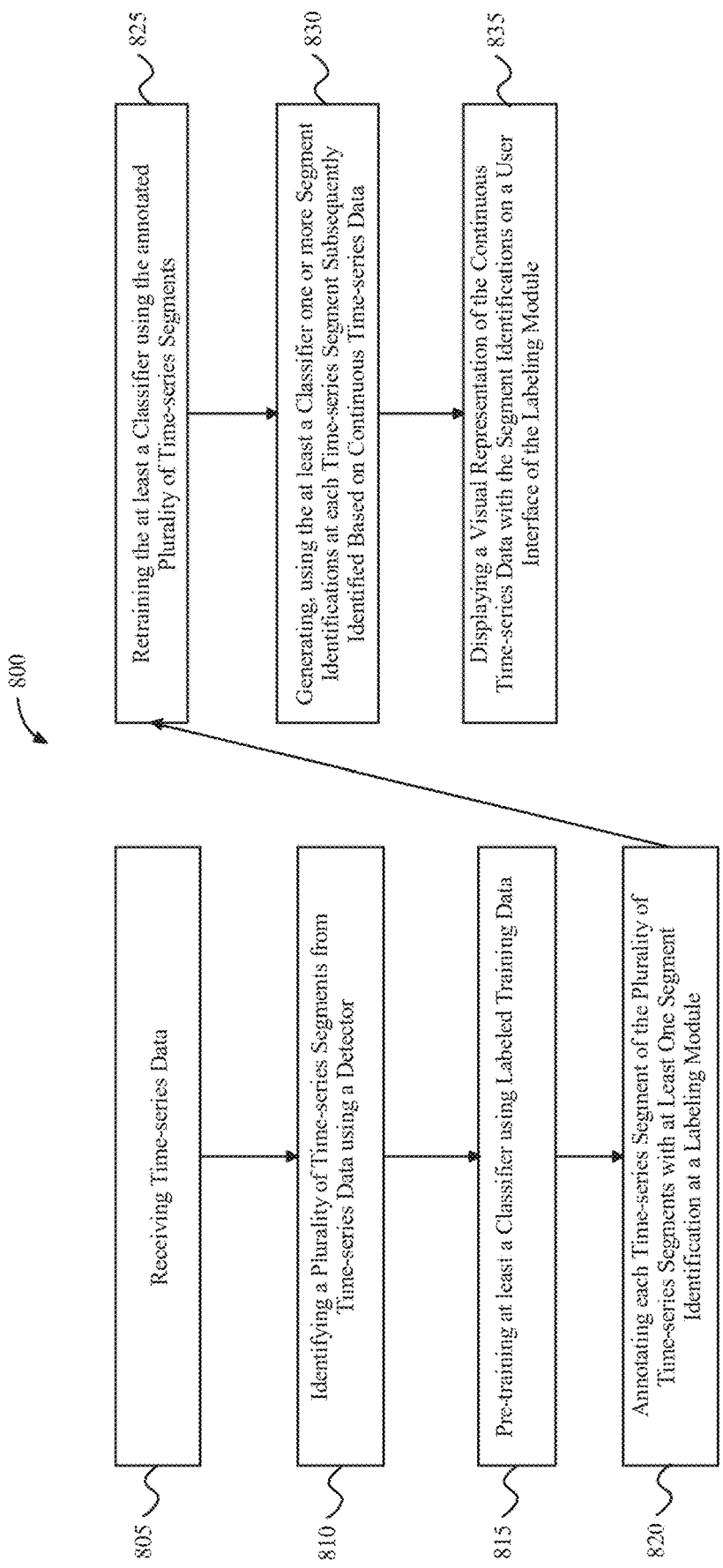
FIG. 8 illustrate a flow diagram of an exemplary method for labeling time-series data using machine learning models.

Now referring to FIG. 8, a flow diagram of an exemplary embodiment of a method 800 for labeling time-series data using machine learning models is illustrated. The method 800 includes a step 805 of receiving, by at least a processor, time-series data. In some embodiments, the time-series data may include cardiac signal data received from one or more cardiac signal monitoring devices communicatively connected to the at least a processor, wherein the cardiac signal data may include at least an electrocardiogram (ECG). In some embodiments, receiving the time-series data may include processing the time-series data by standardizing the time series data into a canonical data format, and verifying the processed time-series data against a set of pre-defined configuration settings. This may be implemented, without limitation, as described above with reference to FIGS. 1, 2A-B, 3, 4A-G, 5-6, and 7A-E.

With continued reference to FIG. 8, method 800 includes a step 810 of identifying, by the at least a processor, a plurality of time-series segments from received time-series data using a detector, wherein the detector includes a one-dimensional U-Net model configured to segment the time-series data into the plurality of time-series segments. In some embodiments, the one-dimensional U-Net model may include a plurality of down-sampling layers for encoding time-series data into feature maps, a bottleneck layer for compressing each one of the feature maps to a reduced input size, a plurality of up-sampling layers for decoding each one of the compressed feature maps back to an original input size, and a plurality of custom blocks integrated within the plurality of down-sampling layers and the plurality of up-sampling layers. In some embodiments, the plurality of custom blocks may include at least a convolution-batch-normalization-rectified-linear unit (CBR) block, at least a squeeze-excitation block (SE) block, and at least a residual (RE) block. This may be implemented, without limitation, as described above with reference to FIGS. 1, 2A-B, 3, 4A-G, 5-6, and 7A-E.

With continued reference to FIG. 8, method 800 includes a step 815 of pre-training, by the at least a processor, at least a classifier using labeled training data, wherein the labeled training data includes a plurality of example time-series segments as input correlated to a plurality of example segment identifications as output. In some embodiments, the at least a classifier may include at least an output layer appended to the plurality of up-sampling layers of the one-dimensional U-Net model, wherein the at least an output layer is configured to generate the at least one segment identification. This may be implemented, without limitation, as described above with reference to FIGS. 1, 2A-B, 3, 4A-G, 5-6, and 7A-E.

With continued reference to FIG. 8, method 800 includes a step 820 of annotating, by the at least a processor, each time-series segment of the plurality of time-series segments with at least one segment identification at a labeling module. In some embodiments, annotating each time-series segment of the plurality of time-series segments may include selectively generating, using the at least a classifier, at least one segment identification for each time-series segment of the plurality of time-series segments. In some embodiments, the at least one segment identification may include a plurality of labels indicative of different characteristics of each time-series segment of the plurality of time-series segments. This may be implemented, without limitation, as described above with reference to FIGS. 1, 2A-B, 3, 4A-G, 5-6, and 7A-E.

With continued reference to FIG. 8, method 800 includes a step 825 of retraining, by the at least a processor, the at least a classifier using the annotated plurality of time-series segments. This may be implemented, without limitation, as described above with reference to FIGS. 1, 2A-B, 3, 4A-G, 5-6, and 7A-E.

With continued reference to FIG. 8, method 800 includes a step 830 of generating, by the at least a processor, using the at least a classifier, one or more segment identifications at each time-series segment of a plurality of time-series segments subsequently identified using the detector based on continuous time-series data. This may be implemented, without limitation, as described above with reference to FIGS. 1, 2A-B, 3, 4A-G, 5-6, and 7A-E.

With continued reference to FIG. 8, method 800 includes a step 835 of displaying, by the at least a processor, a visual representation of the continuous time-series data with the one or more segment identifications on a user interface of the labeling module. In some embodiments, the visual representation of the continuous time-series data comprises the one or more segment identifications overlaid on each one of the plurality of time-series segments subsequently identified. Method 800 may further include a step of modifying, by the at least a processor, the one or more segment identifications as a function of a user input at the labeling model. This may be implemented, without limitation, as described above with reference to FIGS. 1, 2A-B, 3, 4A-G, 5-6, and 7A-E.

Figure 9:
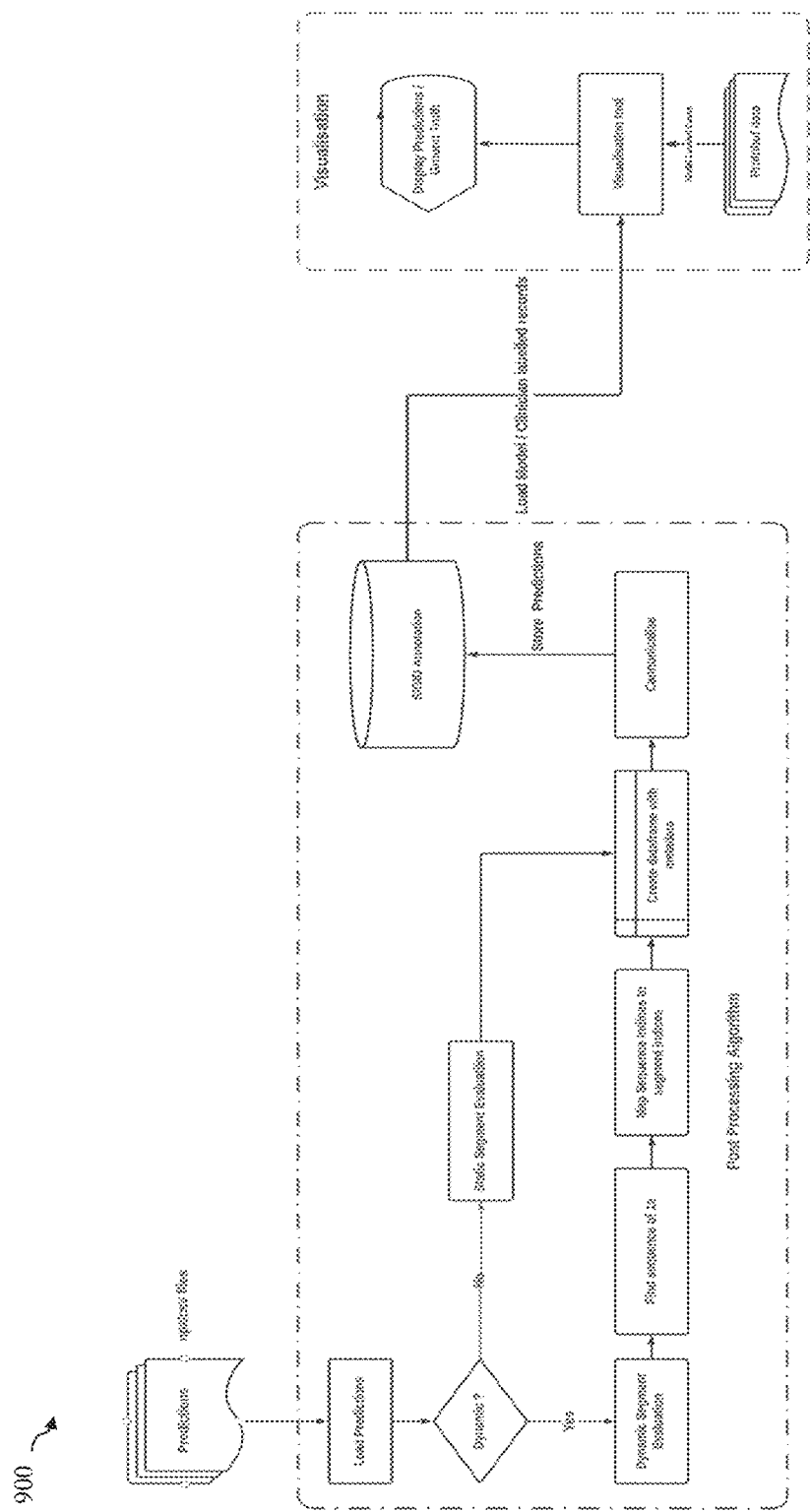
FIG. 9 is a flowchart for labelling and visualization, in accordance with an example embodiment.

Now referring to FIG. 9, an overall flowchart 900 for labelling and visualization of time-series data, according to one exemplary embodiment is illustrated. Model may be fed with a signal which has been previously annotated by the clinician, i.e. processor may have the access to the ground truth for these segments. The output of the model is in terms of batches of arrays which are nothing, but the mask value or predictions done by the U-Net segmentation model. Along with this processor may store corresponding leads and signal indexes for these segments in the batches. Note that the length index i.e. start, and end index undergo the expansion to match the input length for model in the prior stage of the data preparation for model training and testing. Along with these values processor may also store the ground truths for these corresponding batches of arrays. Once evaluation is finished where processor may be configured to compare the ground truth with the prediction of the model via the metrics like confusion matrix, recall, precision and Auc-Roc curve. Processor may create each predictions in form structured table view with start index and end index being index, leads with suffix added as _m indicating the prediction is from Evaluation in static segments and time the record is stored. Simultaneously the folders for each case processed in evaluation is created which is deposited with the protobuf files for these case with leads suffixed with _m. The predictions can be of either label 1—presence of pvp (purple color), or 2—no pvp present (red color)

With continued reference to FIG. 9, additionally, or alternatively, processor may be configured to perform evaluations by a real time simulator. In this format, the model may be fed the data in sequential format in the chunks of the 200 ms data where after each sample is sent the window is moved by the 100 ms. The next 200 ms contains the 100 ms of previous data in order to avoid the situation where the model skips the view of segment which contains the pvp. These predictions are stored in the form of the data frame and the process is repeated till the window reaches the end of the segment. Once processor have the data frame, it converts the data frame into format of start index, end index, leads and time it is created. Prediction may be displayed yes only hence label id would be 1 (purple color) for each predictions and green would indicate no pvp detected in given segment. The index are calculated for each sequence of 1s with relative to length of entire case segment. In case if there are any overlapping rows the last updated row is kept Simultaneously, processor may be configured to generate the protobuf files for each case with suffix _R indicating the data is generated from the real time.

Figure 10:
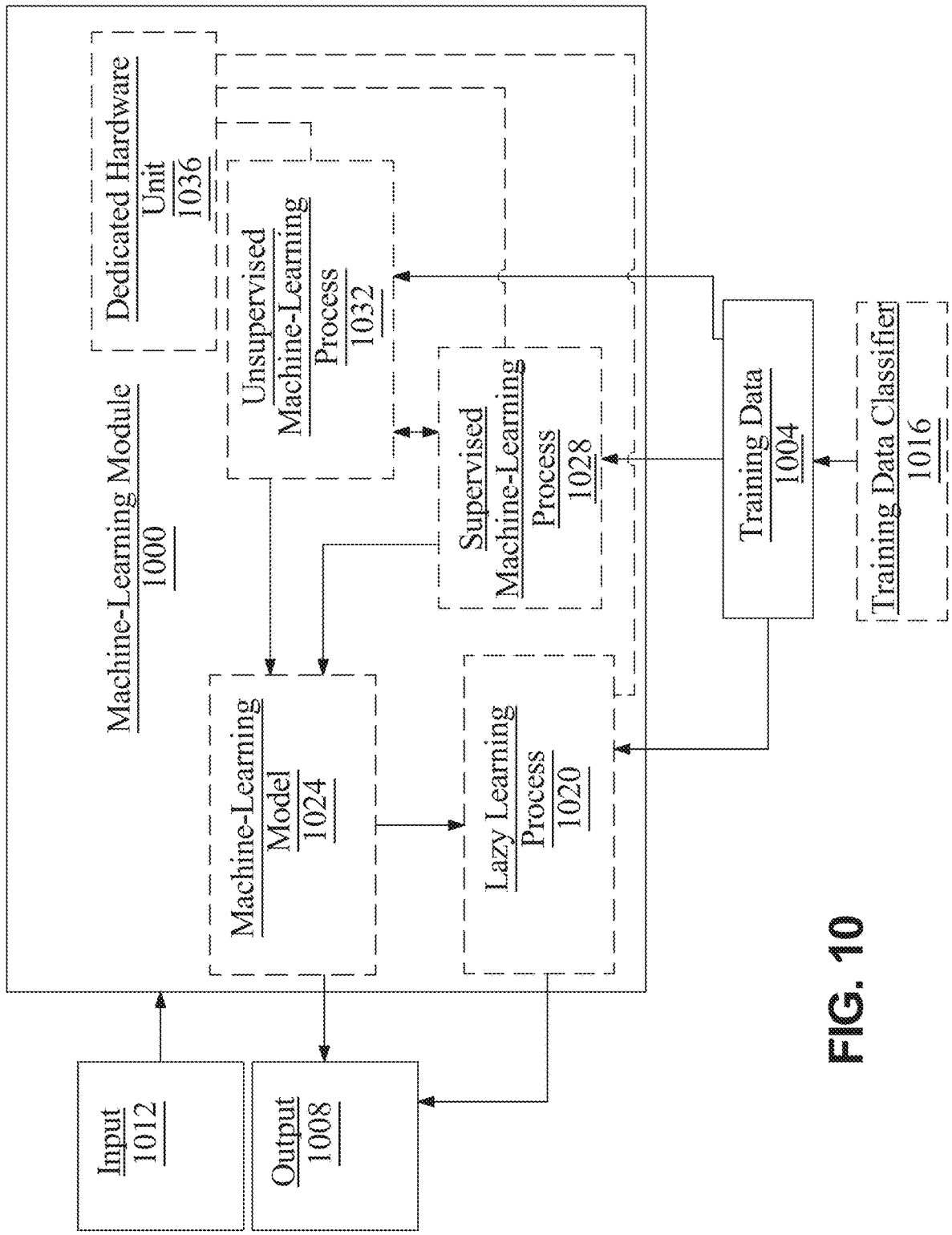
FIG. 10 is a block diagram of an exemplary machine-learning process.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm instantiated in hardware or software logic, data structures, and/or functions that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, training data may include a plurality of time-series segments as input correlated to a plurality of segment identifications as output.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a classifier. A distance metric may include any norm, such as, without limitation, a Pythagorean norm. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 10, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 10, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 10, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 10, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 10, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 10, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 10, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 10, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 10, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Further referring to FIG. 10, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 10, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 10, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of time-series segments as described above as inputs, plurality of segment identifications as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

With further reference to FIG. 10, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 10, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1032 may not require a response variable; unsupervised processes 1032 may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 10, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 10, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 10, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 10, one or more processes or algorithms described above may be performed by at least a dedicated hardware unit 1036. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1036 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1036 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1036 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 11:
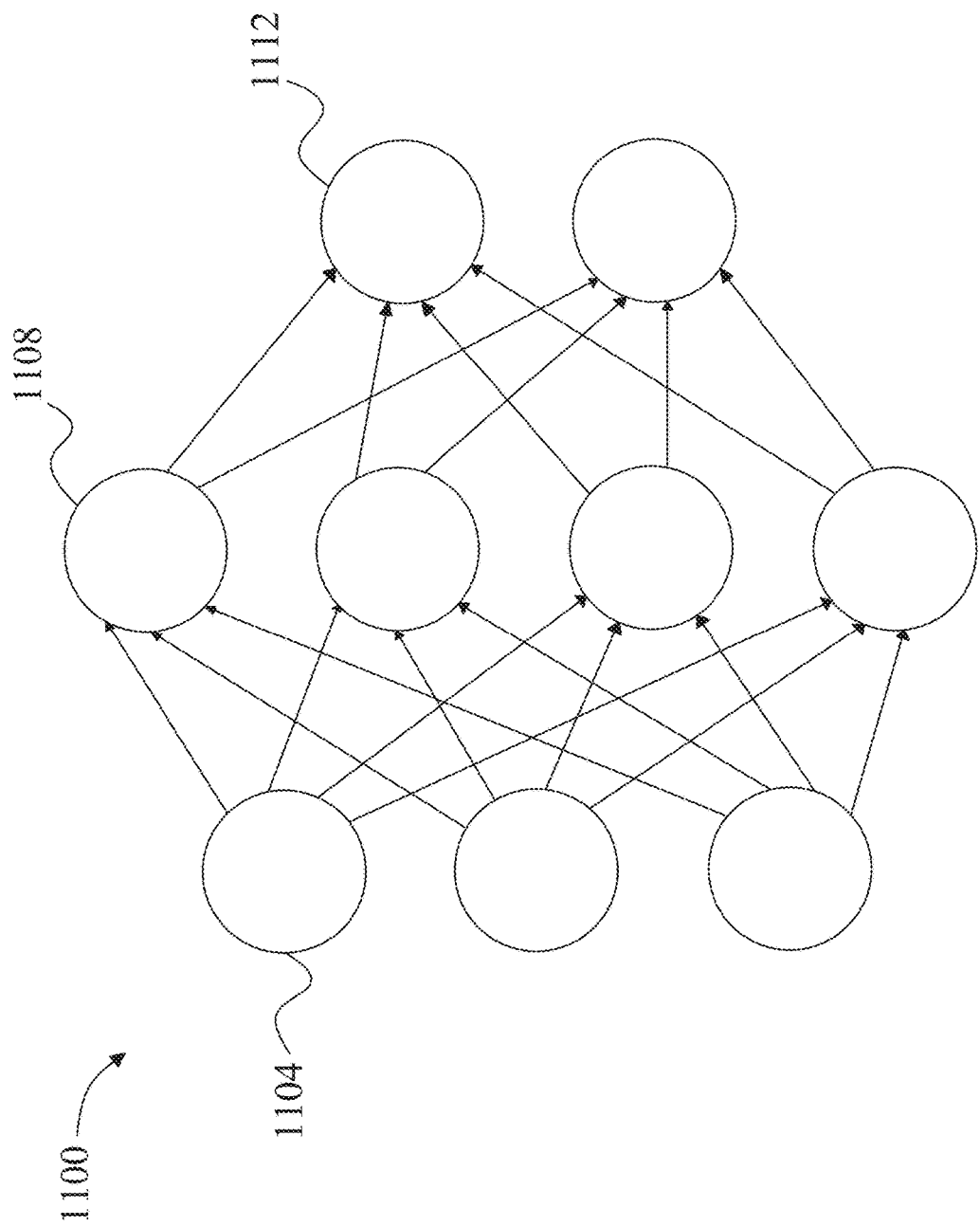
FIG. 11 is a diagram of an exemplary embodiment of a neural network.

Referring now to FIG. 11, an exemplary embodiment of neural network 1100 is illustrated. A neural network 1100 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1104, one or more intermediate layers 1108, and an output layer of nodes 1112. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 12:
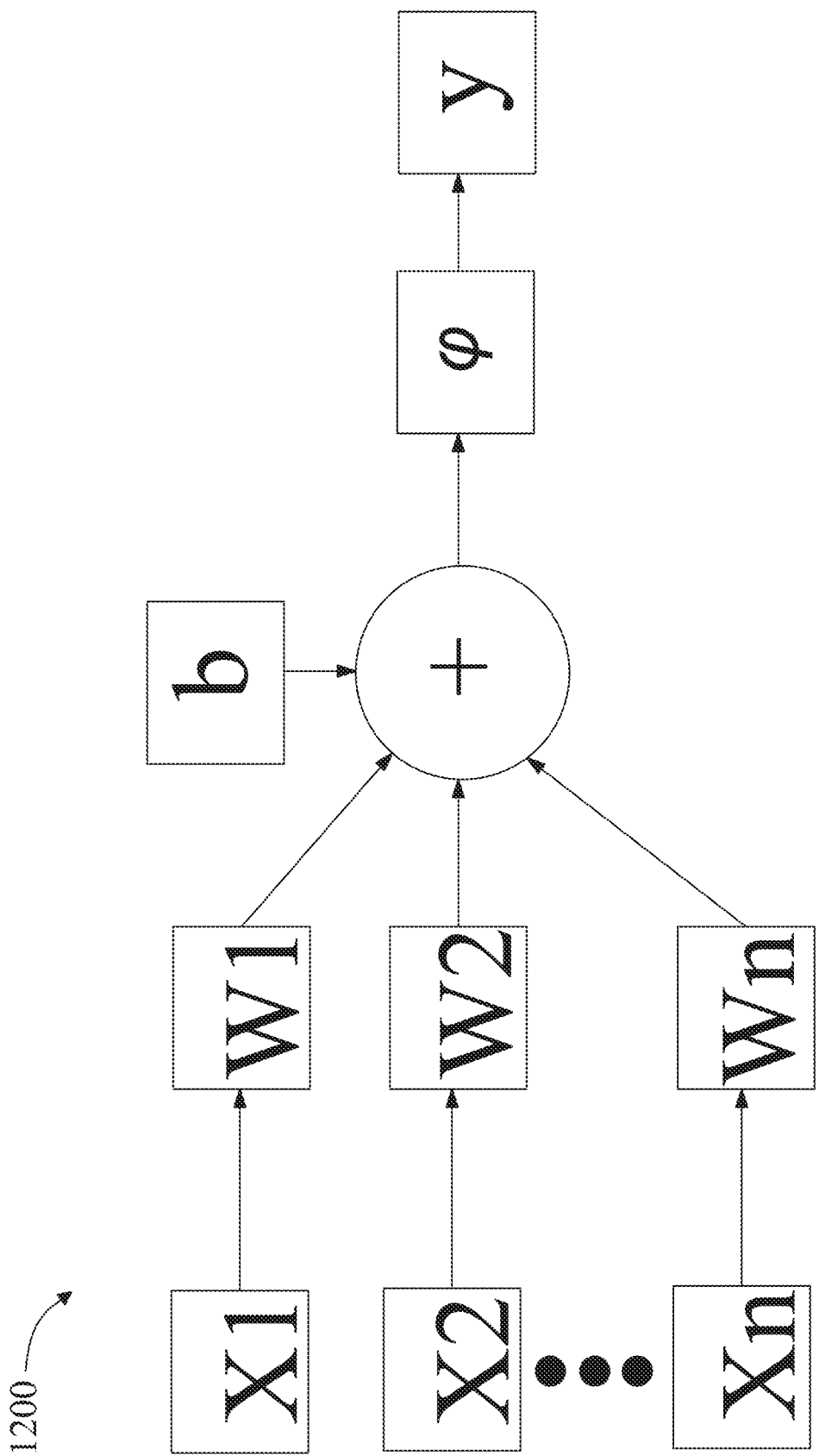
FIG. 12 is a diagram of an exemplary embodiment of a node of a neural network.

Referring now to FIG. 12, an exemplary embodiment of a node 1200 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x; that may be used as activation functions. As a non-limiting and illustrative example, node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
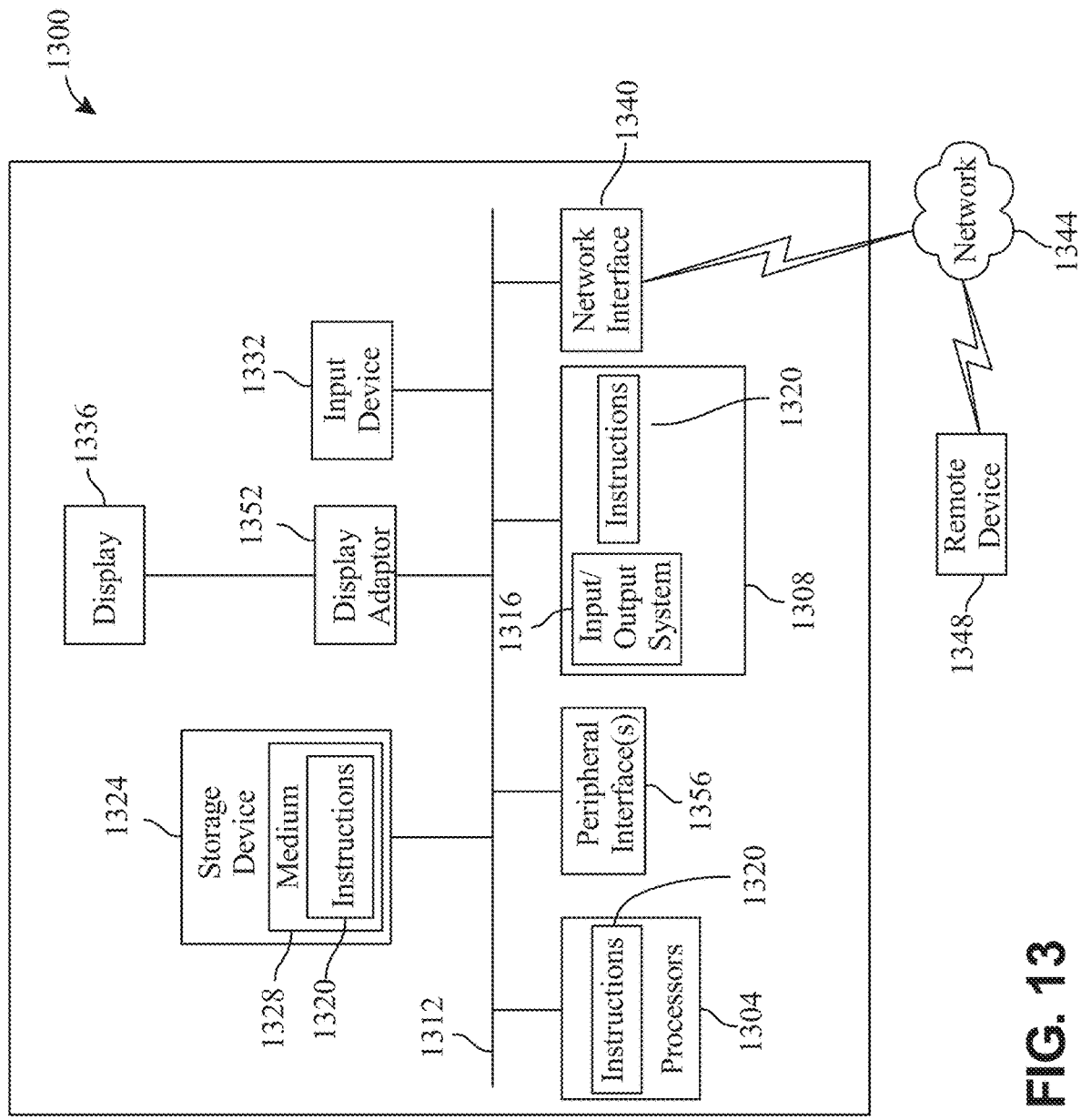
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display device 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for labeling time-series data using machine learning models, the apparatus comprises: at least a processor; and a memory communicatively connected to the at least a processor, wherein the memory contains instructions configuring the at least a processor to: receive time-series data; identify, using a detector, a plurality of time-series segments from the received time-series data, wherein the detector comprises: a one-dimensional U-Net model configured to segment the time-series data into the plurality of time-series segments; pre-train at least a classifier using labeled training data, wherein the labeled training data comprises a plurality of example time-series segments as input correlated to a plurality of example segment identifications as output; annotate, at a labeling module, each time-series segment of the plurality of time-series segments with at least one segment identification; retrain the at least a classifier using the annotated plurality of time-series segments; generate, using the at least a classifier, one or more segment identifications at each time-series segment of a plurality of time-series segments subsequently identified using the detector based on continuous time-series data; and display a visual representation of the continuous time-series data with the one or more segment identifications on a user interface, wherein the one-dimensional U-Net model comprises: a plurality of down-sampling layers for encoding time-series data into feature maps; a bottleneck layer for compressing each one of the feature maps to a reduced input size; a plurality of up-sampling layers for decoding each one of the compressed feature maps back to an original input size; and a plurality of custom blocks integrated within the plurality of down-sampling layers and the plurality of up-sampling layers.

2. The apparatus of claim 1, wherein the time-series data comprises:
   cardiac signal data received from one or more cardiac signal monitoring devices communicatively connected to the at least a processor, wherein the cardiac signal data comprises at least an electrocardiogram (ECG).

3. The apparatus of claim 1, wherein receiving the time-series data comprises:
   processing the time-series data by standardizing the time-series data into a canonical data format; and
   verifying the processed time-series data against a set of pre-defined configuration settings.

4. The apparatus of claim 1, wherein the plurality of custom blocks comprises at least a convolution-batch-normalization-rectified-linear unit (CBR) block, at least a squeeze-excitation block (SE) block, and at least a residual (RE) block.

5. The apparatus of claim 4, wherein the at least a classifier comprises:

at least an output layer appended to the plurality of up-sampling layers of the one-dimensional U-Net model, wherein the at least an output layer is configured to generate the at least one segment identification.

6. The apparatus of claim 1, wherein annotating each time-series segment of the plurality of time-series segments comprises:
selectively generating, using the at least a classifier, at least one segment identification for each time-series segment of the plurality of time-series segments.

7. The apparatus of claim 1, wherein the at least one segment identification comprises a plurality of labels indicative of different characteristics of each time-series segment of the plurality of time-series segments.

8. The apparatus of claim 1, wherein the visual representation of the continuous time-series data comprises the one or more segment identifications overlaid on each one of the plurality of time-series segments subsequently identified.

9. The apparatus of claim 1, wherein the memory contains instructions configuring the at least a processor to modify, at the labeling module, the one or more segment identifications as a function of a user input.

10. A method for labeling time-series data using machine learning models, the method comprises: receiving, by at least a processor, time-series data; identifying, by the at least a processor, a plurality of time-series segments from received time-series data using a detector, wherein the detector comprises: a one-dimensional U-Net model configured to segment the time-series data into the plurality of time-series segments; pre-training, by the at least a processor, at least a classifier using labeled training data, wherein the labeled training data comprises a plurality of example time-series segments as input correlated to a plurality of example segment identifications as output; annotating, by the at least a processor, each time-series segment of the plurality of time-series segments with at least one segment identification at a labeling module; retraining, by the at least a processor, the at least a classifier using the annotated plurality of time-series segments; generating, by the at least a processor, using the at least a classifier, one or more segment identifications at each time-series segment of a plurality of time-series segments subsequently identified using the detector based on continuous time-series data; and displaying, by the at least a processor, a visual representation of the continuous time-series data with the one or more segment identifications on a user interface, wherein the one-dimensional U-Net model comprises: a plurality of down-sampling layers for encoding time-series data into feature maps; a bottleneck layer for compressing each one of the feature maps to a reduced input size; a plurality of up-sampling layers for decoding each one of the compressed feature maps back to an original input size; and a plurality of custom blocks integrated within the plurality of down-sampling layers and the plurality of up-sampling layers.

11. The method of claim 10, wherein the time-series data comprises:
cardiac signal data received from one or more cardiac signal monitoring devices communicatively connected to the at least a processor, wherein the cardiac signal data comprises at least an electrocardiogram (ECG).

12. The method of claim 10, wherein receiving the time-series data comprises:
processing the time-series data by standardizing the time-series data into a canonical data format; and
verifying the processed time-series data against a set of pre-defined configuration settings.

13. The method of claim 10, wherein the plurality of custom blocks comprises at least a convolution-batch-normalization-rectified-linear unit (CBR) block, at least a squeeze-excitation block (SE) block, and at least a residual (RE) block.

14. The method of claim 13, wherein the at least a classifier comprises:
at least an output layer appended to the plurality of up-sampling layers of the one-dimensional U-Net model, wherein the at least an output layer is configured to generate the at least one segment identification.

15. The method of claim 10, wherein annotating each time-series segment of the plurality of time-series segments comprises:
selectively generating, using the at least a classifier, at least one segment identification for each time-series segment of the plurality of time-series segments.

16. The method of claim 10, wherein the at least one segment identification comprises a plurality of labels indicative of different characteristics of each time-series segment of the plurality of time-series segments.

17. The method of claim 10, wherein the visual representation of the continuous time-series data comprises the one or more segment identifications overlaid on each one of the plurality of time-series segments subsequently identified.

18. The method of claim 10, further comprises:
modifying, by the at least a processor, the one or more segment identifications as a function of a user input at the labeling module.

* * * * *